US012179817B2

United States Patent
Wait et al.

(10) Patent No.: US 12,179,817 B2
(45) Date of Patent: Dec. 31, 2024

(54) HYBRID CONSIST TRACTIVE EFFORT MANAGEMENT

(71) Applicant: Progress Rail Services Corporation, Albertville, AL (US)

(72) Inventors: Keith Wesley Wait, Flower Mound, TX (US); Sidarta Fornari Beltramin, Curitiba (BR)

(73) Assignee: Progress Rail Services Corporation, Albertville, AL (US)

(*) Notice: Subject to any disclaimer, the term of this patent is extended or adjusted under 35 U.S.C. 154(b) by 0 days.

(21) Appl. No.: 18/081,003

(22) Filed: Dec. 14, 2022

(65) Prior Publication Data

US 2024/0199099 A1 Jun. 20, 2024

(51) Int. Cl.
*B61L 27/04* (2006.01)
*B61C 3/02* (2006.01)
(Continued)

(52) U.S. Cl.
CPC ............... *B61L 27/04* (2013.01); *B61C 3/02* (2013.01); *B61C 7/04* (2013.01); *B61C 17/06* (2013.01);
(Continued)

(58) Field of Classification Search
CPC .......... B61L 27/04; B61L 27/60; B61L 27/20; B61L 27/70; B61L 15/0018;
(Continued)

(56) References Cited

U.S. PATENT DOCUMENTS 7,124,691 B2   10/2006 Donnelly et al.
7,590,485 B2   9/2009 Daum et al.
(Continued)

FOREIGN PATENT DOCUMENTS

CN   113525340 A  * 10/2021  ............... B60K 6/26
EP   2756423 B1   10/2019

OTHER PUBLICATIONS

Machine Translation of CN113525340A PDF File Name: "CN113525340A_Machine_Translation.pdf".*

(Continued)

*Primary Examiner* — Grant Moubry
*Assistant Examiner* — Ruben Picon-Feliciano

(57) ABSTRACT

A train control system minimizes in-train forces in a train with a hybrid consist including a diesel-electric locomotive and a battery electric locomotive. The train control system includes a virtual in-train forces modeling engine configured to simulate in-train forces and train operational characteristics using physics-based equations, kinematic or dynamic modeling of behavior of the train or components of the train when the train is accelerating, and inputs derived from stored historical contextual data characteristic of the train, and a virtual in-train forces model database configured to store in-train forces models. Each of the in-train forces models includes a mapping between combinations of the stored historical contextual data and corresponding simulated in-train forces and train operational characteristics that occur when the consist is changing speed. An energy management system determines an easing function of tractive effort vs. time that will minimize the in-train forces created by changes in tractive effort responsive to power notch changes in a diesel-electric locomotive, and commands execution of the easing function by a battery electric locomotive based at least in part on an in-train forces model with simulated in-train forces and train operational characteristics that fall within a predetermined acceptable range of values.

20 Claims, 3 Drawing Sheets

(51) Int. Cl.
  *B61C 7/04* (2006.01)
  *B61C 17/06* (2006.01)
  *B61L 15/00* (2006.01)
  *B61L 27/20* (2022.01)
  *B61L 27/60* (2022.01)
  *B61L 27/70* (2022.01)
  *G06N 3/08* (2023.01)

(52) U.S. Cl.
  CPC .............. *B61L 27/60* (2022.01); *G06N 3/08* (2013.01); *B61L 15/0018* (2013.01); *B61L 27/20* (2022.01); *B61L 27/70* (2022.01); *B61L 2201/00* (2013.01)

(58) Field of Classification Search
  CPC ......... B61L 2201/00; B61C 3/02; B61C 7/04; B61C 17/06; G06N 3/08
  See application file for complete search history.

(56) References Cited

U.S. PATENT DOCUMENTS

| | | |
|---|---|---|
| 8,989,917 B2 | 3/2015 | Kumar et al. |
| 10,435,023 B2 | 10/2019 | Soliman et al. |
| 11,192,458 B2 | 12/2021 | Lavertu et al. |
| 2018/0251142 A1* | 9/2018 | Wait .................. G01L 5/284 |
| 2021/0107535 A1* | 4/2021 | Howard .................. B61L 27/20 |
| 2021/0107543 A1 | 4/2021 | Howard et al. |

OTHER PUBLICATIONS

BNSF and Wabtec Commence Battery-electric Locomotive Pilot Test in California, Green Car Congress, Jan. 5, 2021.

Leading the Charge: Battery-electric Locomotives will be Pushing US Freight Trains further, General Electric, Oct. 24, 2018.

* cited by examiner

HYBRID CONSIST TRACTIVE EFFORT MANAGEMENT

TECHNICAL FIELD

The present disclosure relates generally to a system and method for management of the tractive effort output by a consist of train locomotives and, more particularly, a system and method for managing the tractive effort output by a hybrid consist with one or more diesel-electric locomotives and one or more battery electric locomotives.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units or based at least in part on commands generated by an onboard energy management system in conjunction with information that may be received from other locomotives or offboard sources of information. For example, the supplied tractive and/or braking efforts may be based on Positive Train Control (PTC) instructions or control information for an upcoming trip. The control information may be used by a software application to determine the speed and acceleration of the rail vehicle for various segments of an upcoming trip of the rail vehicle. Control systems and subsystems for controlling and monitoring the tractive and/or braking efforts performed by one or more locomotives of the rail vehicle and performing other operations associated with the locomotives and other rail cars in a train may be located in part on the rail vehicle and/or distributed across one or more servers off-board the vehicle at one or more remote control stations.

A goal in the operation of the locomotives and other rail cars in a train is to provide the most accurate and up-to-date information regarding operational characteristics of the entire train and all computer systems and subsystems of the train to a human or autonomous operator located on-board or at a remote controller interface, and to enable the operator to operate the train at optimal speeds, accelerations, and operating points for the most efficient use of fuel while meeting overall trip goals and avoiding excessive in-train forces, especially while accelerating from a stop. In order to achieve these goals, a reliable, precisely calibrated and synchronized computerized control system must be provided in order to transmit train control commands and other data indicative of operational characteristics associated with the various computer systems and subsystems of the locomotive consists and other rail cars between the train and an off-board, remote controller interface (also sometimes referred to as the "back office"). The control system must be capable of transmitting data messages having the information used to control the tractive and/or braking efforts of the rail vehicle and other operational characteristics of the various consist subsystems while the rail vehicle is moving. The control system must also be able to transmit information regarding a detected fault on-board a locomotive, and possibly respond with control commands to reset the fault. There is also a need for a train tracking and monitoring system that determines and presents current, real-time position information for one or more trains in a railroad network, the configuration or arrangement of powered and non-powered units within each of the trains, and operational status of the various systems and subsystems of the trains that are being tracked. Advances in the bandwidth, throughput, data transmission speeds, and other capabilities of various telecommunication networks, including 5G wireless communication networks, enables the placement of a large number of sensor devices throughout the train, and communication of sensor data to and from various control systems and subsystems of the trains. The control systems and subsystems may be distributed locally on leading and trailing consists of the trains, and/or remotely, off-board the trains at one or more distributed remote servers or control centers such as the back office and other control centers connected over the Internet. Proper synchronization, calibration, and coordination between the distributed control systems is important for determining the exact configuration of the train and operational status of all train assets, systems, and subsystems at any point in time, and implementing reconfiguration of train assets and/or changes in operational parameters of the systems and subsystems when necessary to meet operational goals, such as minimizing jerk or other in-train forces when the train is accelerated.

One example of a powered system, such as a train, that includes a control system for remotely controlling speed regulation of the powered system to improve efficiency of operation of the powered system is disclosed in U.S. Pat. No. 8,989,917 of Kumar, that issued on Mar. 24, 2015 ("the '917 patent"). In particular, the '917 patent discloses a system for operating a remotely controlled powered system. The system includes feedforward and feedback elements configured to provide and receive information related to predicted and actual movement of the powered system to remotely control the speed of the system to improve efficiency of operation.

Although useful in allowing for remote control of the speed of operation of one or more locomotives in a train, the system of the '917 patent does not have any means for further improving variations and responsiveness of tractive effort vs. time for a locomotive consist at a finer granularity than is possible with only conventional notch power control on legacy diesel-electric locomotives. In particular, the '917 patent does not provide a train control system capable of assimilating one or more battery electric locomotives (BELs) with existing diesel-electric locomotives in a hybrid consist to achieve fuel savings benefits along with reduced in-train forces through the implementation of easing functions of tractive effort vs. time by a BEL to achieve a minimum jerk trajectory when accelerating.

The present disclosure is directed at overcoming one or more of the shortcomings set forth above and/or other problems of the prior art.

SUMMARY

In one aspect, the present disclosure is directed to a train control system for minimizing in-train forces in a train with a hybrid consist including a plurality of locomotives, wherein the hybrid consist includes at least one diesel-electric locomotive and at least one battery electric locomotive. The train control system includes a virtual in-train forces modeling engine configured to simulate in-train forces and train operational characteristics using physics-based equations, kinematic or dynamic modeling of behavior of the train or components of the train during operation when the consist is changing speed, and inputs derived from stored historical contextual data characteristic of the train, a virtual in-train forces model database configured to store one or more virtual in-train forces models simulated by the virtual in-train forces modeling engine, wherein each of the one or more virtual in-train forces models includes a mapping between different combinations of the stored historical contextual data and corresponding simulated in-train forces and train operational characteristics that occur when the consist is changing speed, and an energy management system associated with one or more locomotives of the train and configured to determine an easing function of tractive effort vs. time that will minimize the in-train forces created by changes in tractive effort responsive to power notch changes in the at least one diesel-electric locomotive, and command execution of the easing function by one or more of the battery electric locomotives based at least in part on one of the virtual in-train forces models with the simulated in-train forces and train operational characteristics falling within a predetermined acceptable range of values.

In another aspect, the present disclosure is directed to a method of minimizing in-train forces in a train with a hybrid consist including a plurality of locomotives, wherein the hybrid consist includes at least one diesel-electric locomotive and at least one battery electric locomotive. The method includes receiving real-time and historical operational and structural data from one or more of systems and components of the train at a data acquisition hub communicatively connected to one or more of sensors and databases associated with one or more locomotives or other components of the train, simulating, using a virtual system modeling engine, in-train forces and train operational characteristics using physics-based equations, kinematic or dynamic modeling of behavior of the train or components of the train during operation when the consist is changing speed, and inputs derived from stored historical contextual data characteristic of the train, and storing one or more virtual system models simulated by the virtual system modeling engine in a virtual system model database, wherein each of the one or more virtual system models includes a mapping between different combinations of the stored historical contextual data and corresponding simulated in-train forces and train operational characteristics that occur when the consist is changing speed. An energy management system associated with one or more locomotives of the train determines an easing function of tractive effort vs. time that will minimize the in-train forces created by changes in tractive effort responsive to power notch changes in the at least one diesel-electric locomotive, and command execution of the easing function by one or more of the battery electric locomotives based at least in part on one of the virtual system models with the simulated in-train forces and train operational characteristics falling within a predetermined acceptable range of values.

In yet another aspect, the present disclosure is directed to a hybrid consist of a train with at least one diesel-electric locomotive and at least one battery electric locomotive, wherein the hybrid consist includes a train control system for minimizing in-train forces in the train. The train control system includes a virtual in-train forces modeling engine configured to simulate in-train forces and train operational characteristics using physics-based equations, kinematic or dynamic modeling of behavior of the train or components of the train during operation when the consist is changing speed, and inputs derived from stored historical contextual data characteristic of the train, and a virtual in-train forces model database configured to store one or more virtual in-train forces models simulated by the virtual in-train forces modeling engine, wherein each of the one or more virtual in-train forces models includes a mapping between different combinations of the stored historical contextual data and corresponding simulated in-train forces and train operational characteristics that occur when the consist is changing speed. An energy management system determines an easing function of tractive effort vs. time that will minimize the in-train forces created by changes in tractive effort responsive to power notch changes in the at least one diesel-electric locomotive, and command execution of the easing function by one or more of the battery electric locomotives based at least in part on one of the virtual in-train forces models with the simulated in-train forces and train operational characteristics falling within a predetermined acceptable range of values.

DETAILED DESCRIPTION

Figure 1:
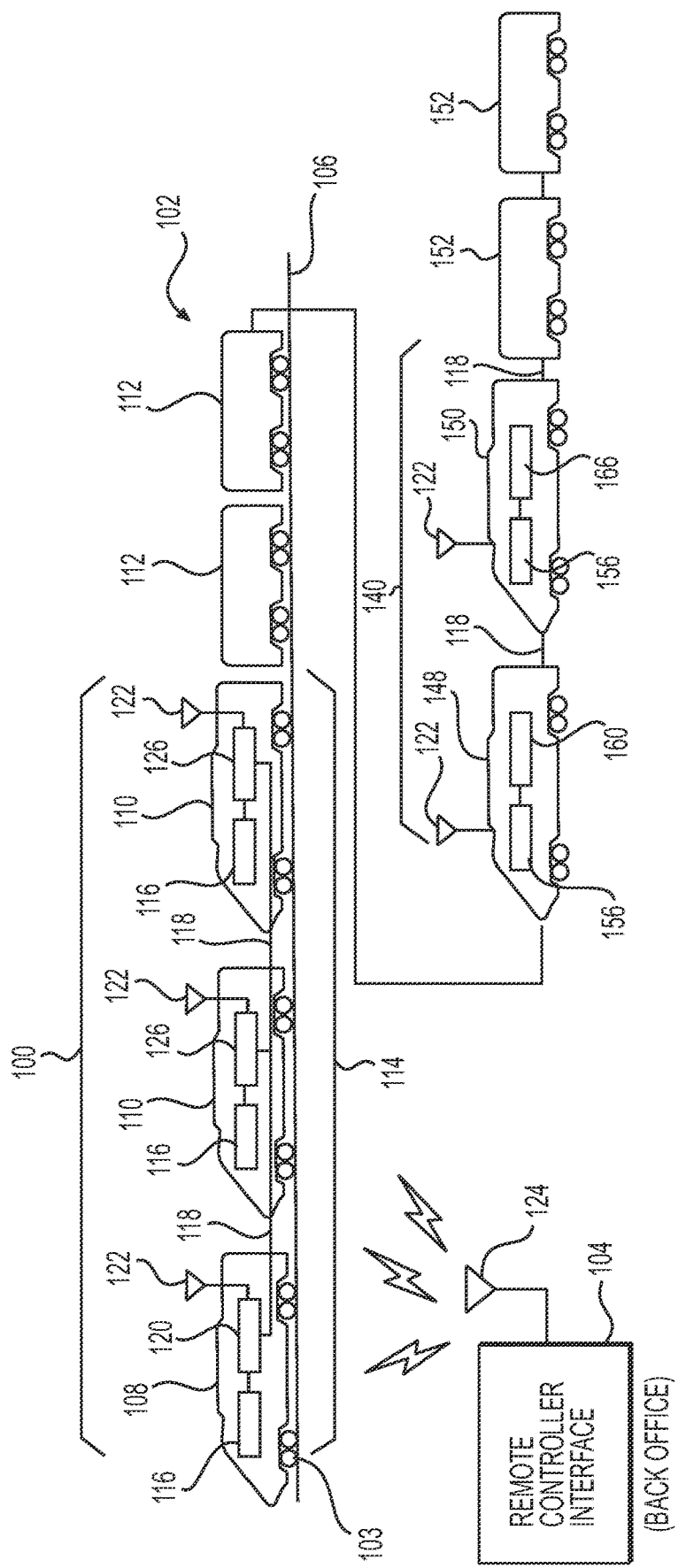
FIG. 1 is a schematic diagram of one embodiment of a control system for a train.

FIG. 1 is a schematic diagram of one embodiment of a train control system 100 for operating a train 102 traveling along a track 106. The train may include multiple rail cars (including powered and/or non-powered rail cars or units) linked together as one or more consists. One or more of the consists may be a hybrid consist that includes one or more diesel-electric locomotives and one or more battery electric locomotives (BELs). The control system 100 may provide for cost savings, improved safety, reduced in-train forces, increased reliability, operational flexibility, and convenience in the control of the train 102 through communication of network data between an off-board remote controller interface 104 and the train 102. The train control system 100 may also provide a means for remote operators or third party operators to communicate with the various locomotives or other powered units of the train 102 from remote interfaces that may include any computing device connected to the Internet or other wide area or local communications network. The train control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via pagers, mobile telephone, email, and online screen alerts. The data communicated between the train 102 and the off-board remote controller interface 104 may include signals indicative of various operational parameters associated with components and subsystems of the train, signals indicative of fault conditions, signals indicative of maintenance activities or procedures, and command and control signals operative to change the state of various circuit breakers, throttles, brake controls, actuators, switches, handles, relays, and other electronically-controllable devices on-board any locomotive or other powered unit of the train 102. The remote controller interface 104 also enables the distribution of the various computer systems such as control systems and subsystems involved in operation of the train or monitoring of train operational characteristics at one or more remote locations off-board the train and accessible by authorized personnel over the Internet, wireless telecommunication networks, and by other means. In various exemplary embodiments, a centralized or cloud-based computer processing system may be located in one or more of a back-office server or a plurality of servers remote from the train. One or more distributed, edge-based computer processing systems may be located on-board one or more locomotives of the train, and each of the distributed computer processing systems may be communicatively connected to the centralized computer processing system.

Some control strategies undertaken by the train control system 100 may include asset protection provisions, whereby asset operations are automatically derated or otherwise reduced in order to protect train assets, such as a locomotive, from entering an overrun condition and sustaining damage. For example, when the control system detects via sensors that the coolant temperature, oil temperature, crankcase pressure, or another operating parameter associated with a locomotive has exceeded a threshold, the control system may be configured to automatically reduce engine power (e.g., via a throttle control) to allow the locomotive to continue the current mission with a reduced probability of failure. In addition to derating or otherwise reducing certain asset operations based on threshold levels of operational parameters, asset protection may also include reducing or stopping certain operations based on the number, frequency, or timing of maintenance operations or faults detected by various sensors. In some cases, the control system may be configured to fully derate the propulsion systems of the locomotive and/or bring the train 102 to a complete stop to prevent damage to the propulsion systems in response to signals generated by sensors. In this way, the control system may automatically exercise asset protection provisions of its control strategy to reduce incidents of debilitating failure and the costs of associated repairs.

Train control system 100 according to various embodiments of this disclosure may be configured for minimizing in-train forces in a train with a hybrid consist including a plurality of locomotives, wherein the hybrid consist includes at least one diesel-electric locomotive and at least one battery electric locomotive. Train control system 100 may include an analytics engine and a calibration engine programmed to assimilate, analyze, and calibrate real time information from the locomotives and from sensors disposed on draft gears and couplers (e.g., manual couplers, semi-automatic couplers like Janney or AAR couplers, and fully automatic couplers like the Scharfenberg coupler) interconnecting the locomotives or the locomotives and other rail cars in the train with determinations made by a virtual in-train forces modeling engine onboard at least one of the plurality of locomotives, with the plurality of locomotives of the train being configured to operate collectively based on a common goal of minimizing in-train forces while optimizing fuel consumption for the train.

The train control system may include a data acquisition hub communicatively connected to one or more of sensors and databases associated with one or more locomotives or other components of a train and configured to acquire real-time and historical operational and structural data from one or more of systems and components of the train. The one or more sensors acquiring real-time data include one or more of LIDAR sensors, RADAR sensors, accelerometers, gyroscopic sensors, optical recognition sensors, and physical strain gauges configured to measure displacements or forces at the draft gears and couplers interconnecting the locomotives. The virtual in-train forces modeling engine may be configured to simulate in-train forces and train operational characteristics using physics-based equations, kinematic or dynamic modeling of behavior of the train or components of the train during operation when the consist is changing speed, and inputs derived from stored historical contextual data comprising one or more of a number of locomotives in the train; position or type of each locomotive; age or amount of usage of one or more locomotives of the train or other components of the train; weight distribution of the train; length of the train; speed of the train; control configurations for one or more locomotives or consists of the train; power notch settings of one or more locomotives of the train; braking implemented in the train; grade, temperature, or other characteristics of train tracks on which the train is operating; state of health (SOH), state of charge (SOC), number of charge cycles, or cell temperatures of one or more batteries in the at least one battery electric locomotive; and diesel engine operational parameters that affect performance of one or more locomotive engines for the train. Contextual data refers to information and data related to the circumstances in which an event occurred during which the data was gathered and/or recorded. Some examples of the circumstances in which the contextual data may have been gathered may include a time of year, weather conditions, elevation, geographical characteristics, regulatory considerations, etc.

A virtual in-train forces model database may be configured to store one or more virtual in-train forces models simulated by the virtual in-train forces modeling engine, wherein each of the one or more virtual in-train forces models includes a mapping between different combinations of the stored historical contextual data and corresponding simulated in-train forces and train operational characteristics that occur when the consist is changing speed. The train control system may also include an energy management system associated with one or more locomotives of the train and configured to determine an easing function of tractive effort vs. time that will minimize the in-train forces created by changes in tractive effort responsive to power notch changes in the at least one diesel-electric locomotive, command execution of the easing function by one or more of the battery electric locomotives, and adjust one or more of throttle requests, dynamic braking requests, and pneumatic braking requests for the one or more diesel-electric locomotives of the train based at least in part on one of the virtual in-train forces models with the simulated in-train forces and train operational characteristics falling within a predetermined acceptable range of values. An example of a desired motion control trajectory for a train in which in-train forces are minimized may be referred to as a "minimum jerk trajectory". Whereas the tractive effort changes resulting from power notch changes in a diesel-electric locomotive may change linearly over time, the cumulative effect of combining the tractive effort over time of a diesel-electric locomotive with the tractive effort over time of a battery electric locomotive according to various embodiments of this disclosure, may be the so-called "minimum jerk trajectory," wherein an operator or other passengers onboard a locomotive of the train will experience a relatively smooth ride as the train is accelerated from a stop. The virtual in-train forces modeling engine enables the energy management system on-board a lead locomotive, or on-board individual locomotives operating under independent control rather than command and control from a lead locomotive, to generate a tractive effort vs. time curve that can be provided to one or more battery electric locomotives in the train to achieve the minimum jerk trajectory. In various alternative embodiments, the battery electric locomotives may be provided with a predetermined selection of easing functions to be followed when generating tractive effort over time such that one or more energy management systems of the locomotives may select an easing function of tractive effort vs. time and determine the time over which the selected easing function should be followed. Examples of easing functions that may be provided include functions of tractive effort vs. time that follow various mathematically-derived relationships such as sinusoidal functions, quadratic functions, cubic functions, exponential functions, and logarithmic functions.

The off-board remote controller interface 104 may be connected with an antenna module 124 configured as a wireless transmitter or transceiver to wirelessly transmit data messages and control commands to the train 102. The messages and commands may originate elsewhere, such as in a rail-yard back office system, one or more remotely located servers (such as in the "cloud"), a third party server, a computer disposed in a rail-yard tower, and the like, and be communicated to the off-board remote controller interface 104 by wired and/or wireless connections. Alternatively, the off-board remote controller interface 104 may be a satellite that transmits the messages and commands down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102.

As described below, the network data can include information used to automatically and/or remotely control operations of the train 102 or lead and trailing consists and other subsystems of the train, and/or reference information stored and used by the train 102 during operation of the train 102. The network data communicated to the off-board remote controller interface 104 from the train 102 may also provide alerts and other operational information that allows for remote monitoring, diagnostics, asset management, and tracking of the state of health of all of the primary power systems and auxiliary subsystems such as the various systems onboard the diesel-electric locomotives, including the fueling system, electronic ignition system, lubrication system, cooling system, HVAC, air brakes, lights, event recorders, and the like. Additional non-standard communication channels may communicate information to and from the battery electric locomotives (BEL's), including the SOC, SOH, number of charge cycles, and cell temperatures of the batteries onboard the BELs. The increased use of distributed computer system processing enabled by advances in network communications, including but not limited to 5G wireless telecommunication networks, allows for the remote location of distributed computer system processors that may perform intensive calculations and/or access large amounts of real-time and historical data related to the train operational parameters. This distributed computer system processing may also introduce potential breakdowns in communication or transient latency issues between the distributed nodes of the communication network, leading to potential synchronization and calibration problems between various computer control systems and subsystems. The train control system 100 and/or offboard remote control interface 104, according to various embodiments of this disclosure, may employ artificial intelligence algorithms and/or machine learning engines or processing modules to train learning algorithms and/or create virtual system models and perform comparisons between real-time data, historical data, and/or predicted data, to find indicators or patterns in which the distributed computer systems may face synchronization problems. The early identification of any potential synchronization or calibration problems between the various distributed computer systems or subsystems using machine learning and virtual system models enables early implementation of proactive measures to mitigate the problems.

The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as locomotives. "Non-powered units" refers to rail cars that are incapable of self-propulsion, but which may otherwise receive electric power for other services. For example, freight cars, passenger cars, and other types of rail cars that do not propel themselves may be "non-powered units" even though the cars may receive electric power for cooling, heating, communications, lighting, and other auxiliary functions. The locomotives of one or more of lead or trailing locomotive consists in a train may include one or more diesel-electric locomotives and one or more battery electric locomotives.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists. In some exemplary implementations, the first locomotive 108 of the lead consist 114 may be a standard diesel-electric locomotive, second locomotive 110 in the lead consist 114 may be a battery electric locomotive, and the third locomotive 110 in the lead consist 114 may be another standard diesel-electric locomotive. Other combinations of diesel-electric locomotives and battery electric locomotives may also make up lead consist 114 and/or trailing consist 140.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are slaved to a lead locomotive, or under at least partial control of a lead locomotive.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include a diesel-electric power train with electric and/or mechanical devices and components, such as a diesel engine, an electric generator, and AC or DC traction motors, or a battery electric power train with one or more batteries for energy storage and one or more electric motors to provide tractive effort that propels the powered units 108, 110 and braking effort that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty-seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection—such as over a 5G telecommunication network. Similarly, the propulsion subsystems 156 of the powered units 148, 150 in the trailing consist 140 may be connected and communicatively coupled to each other by the network connection 118, such as a MU cable extending between the powered units 148, 150, or wireless connections.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. The lead communication unit 120 may be the unit that initiates the transmission of data packets forming a message to the off-board, remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic braking, the tripping of a circuit breaker on-board the lead powered unit, or other operational characteristics. Additional operational information associated with a locomotive such as an amount of wheel slippage, wheel temperatures, wheel bearing temperatures, brake temperatures, and dragging equipment detection may also be communicated from sensors on-board a locomotive or other train asset, or from various sensors located in wayside equipment or sleeper ties positioned at intervals along the train track. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board, remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, a single 5G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, 4G antenna modules, and/or 5G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data and command control signals from the off-board device 104 may in turn re-transmit that received data and signals to the appropriate lead communication unit 120 of the lead locomotive consist 114, or the lead communication unit 160 of the trailing locomotive consist 140. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board, remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the remote controller interface 104 rather than at the lead powered unit 108 of the lead consist 114.

Each locomotive or powered unit of the train 102 may include a car body supported at opposing ends by a plurality of trucks. Each truck may be configured to engage the track 106 via a plurality of wheels, and to support a frame of the car body. One or more traction motors may be associated with one or all wheels of a particular truck, and any number of engines and generators may be mounted to the frame within the car body to make up the propulsion subsystems 116, 156 on each of the diesel-electric powered units. Energy storage devices such as lithium-ion batteries may be mounted to the frame within the car body on a battery electric locomotive, along with one or more electric motors and other power transmission components that transfer stored electrical power to electric traction motors connected to the wheels on each truck of the battery electric locomotive. The propulsion subsystems 116, 156 of each of the powered units may be further interconnected throughout the train 102 along one or more high voltage power cables in a power sharing arrangement. Energy storage devices may also be included for short-term or long-term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. In the case of a battery electric locomotive, the lithium ion batteries or other batteries onboard the locomotive that serve as the prime source of power may be charged directly by the traction motors onboard the locomotive during dynamic braking, or through power sharing over the high voltage power cables with the traction motors on other locomotives providing an additional source of power. Control over engine operation (e.g., starting, stopping, fueling, exhaust aftertreatment, etc.) and traction motor operation, as well as other locomotive controls, may be provided by way of an on-board controller 200 and various operational control devices housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote controller interface 104, or at a powered unit of a trailing consist. As discussed above, the various computer control systems involved in the operation of the train 102 may be distributed across a number of local and/or remote physical locations and communicatively coupled over one or more wireless or wired communication networks.

Figure 2:
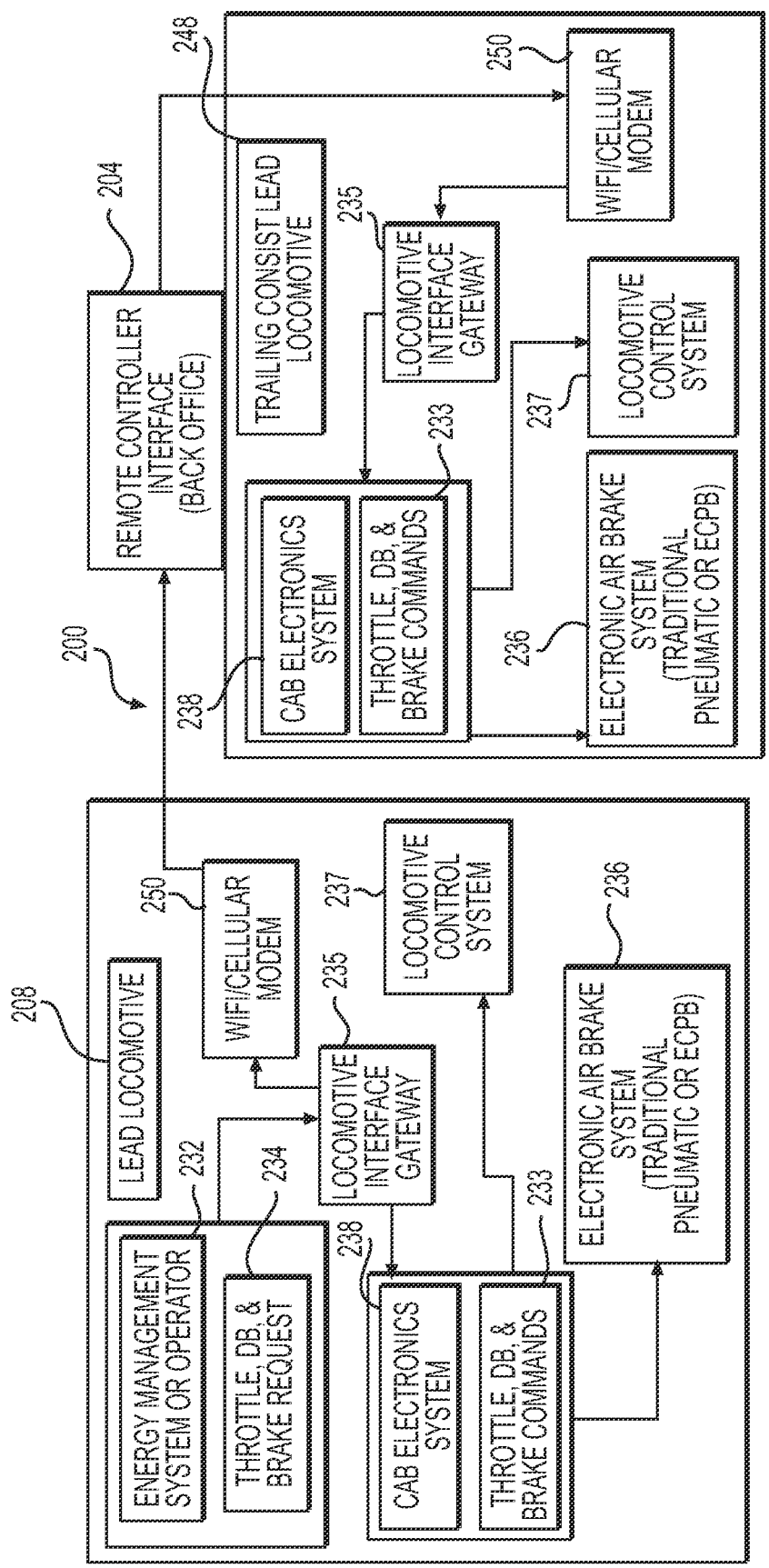
FIG. 2 is a block diagram of one implementation of a portion of the control system illustrated in FIG. 1.

As shown in FIG. 2, an exemplary implementation of the control system 100 may include the on-board controller 200. The on-board controller 200 may include an energy management system 232 configured to determine, e.g., one or more of throttle requests, dynamic braking requests, and pneumatic braking requests 234 for one or more of the powered and non-powered units of the train. The energy management system 232 may be configured to make these various requests based on a variety of measured operational parameters, track grade, track conditions, freight loads, trip plans, and predetermined maps or other stored data with one or more goals of reducing in-train forces, improving safety and comfort for crew, cargo, and/or passengers, timeliness, overall fuel economy and emissions output for individual powered units, consists, or the entire train. Energy management system 232 associated with one or more locomotives of the train may be configured to determine an easing function of tractive effort vs. time that will minimize the in-train forces created by changes in tractive effort responsive to power notch changes in at least one diesel-electric locomotive of the train, command execution of the easing function by one or more of the battery electric locomotives of the train, and adjust one or more of throttle requests, dynamic braking requests, and pneumatic braking requests for the one or more diesel-electric locomotives of the train based at least in part on one of the virtual in-train forces models with the simulated in-train forces and train operational characteristics falling within a predetermined acceptable range of values.

The diesel-electric locomotives typically achieve discrete levels of tractive effort at a given speed as a result of the throttle valve controls for the prime mover—the diesel engine. The throttle valve for a diesel-electric locomotive typically has 8 notch levels at which it can be set, with the throttle valve electrically controlling speed and power by actuating a speed governor on the diesel engine and stepping up main generator excitation and output as the throttle is advanced through each of the eight notch levels. From a standing start in the switching mode, a specific tractive effort is available for each operating notch of the throttle. In contrast, the battery electric locomotives can theoretically achieve a nearly continuous range of tractive efforts at different speeds up to their maximum power levels and with the ability to change the tractive effort vs. time nearly instantaneously. Energy management system 232 according to embodiments of this disclosure may be configured to control the diesel-electric locomotive(s) and battery electric locomotive(s) in a consist(s) of a train such that the locomotives are operated at levels of tractive effort that not only improve fuel consumption, but also minimize in-train forces and achieve a minimum jerk trajectory for the train during changes in speed of the consist. The energy management system may be configured to actually calculate a particular easing function of tractive effort vs. time in real time based on measured forces at the couplers between the locomotives in a consist, differential velocities between the locomotives, and other operational characteristics of the locomotives and train track characteristics, and send the easing function to one or more battery electric locomotives in the consist. Alternatively, or in addition, the energy management system may be configured to access a stored selection of easing functions of tractive effort vs. time, and when sending a notch command to the diesel-electric locomotives in a consist, may simultaneously send a preselected easing function and instructions on when the preselected easing function should be implemented by one or more battery electric locomotives to achieve the desired tractive effort trajectory for the train.

The cab of the lead powered unit 108, 148 in each of the consists may also house a plurality of operational control devices and control system interfaces. The operational control devices may be used by an operator to manually control the locomotive, or may be controlled electronically via messages received from off-board the train. Operational control devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other operational control devices that may be manually movable between a run or activated state and an isolation or deactivated state by an operator of the train 102. The operational control devices may be additionally or alternatively activated and deactivated by solenoid actuators or other electrical, electromechanical, or electro-hydraulic devices. The off-board remote controller interface 104, 204 may also require compliance with security protocols to ensure that only designated personnel may remotely activate or deactivate components on-board the train from the off-board remote controller interface after certain prerequisite conditions have been met. The off-board remote controller interface may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers may be associated with particular components or subsystems of a locomotive on the train 102 and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. Additionally, in the case of battery electric locomotives, onboard controller 200 and/or energy management system 232 may be configured to monitor the SOC, SOH, number of charge cycles for each battery and/or battery cell onboard each locomotive, and cell temperatures for each battery, and trip a circuit breaker when any of these characteristics fall outside of a predetermined allowable range. In some implementations of this disclosure, a circuit breaker may be associated with an on-board control system or communication unit that controls wireless communication with the off-board remote controller interface. After a particular circuit breaker trips, the associated component or subsystem may be disconnected from the main electrical circuit of the locomotive 102 and remain nonfunctional until the corresponding breaker is reset. The circuit breakers may be manually tripped or reset. Alternatively or in addition, the circuit breakers may include actuators or other control devices that can be selectively energized to autonomously or remotely switch the state of the associated circuit breakers in response to a corresponding command received from the off-board remote controller interface 104, 204. In some embodiments, a maintenance signal may be transmitted to the off-board remote controller interface 104, 204 upon switching of a circuit breaker from a first state to a second state, thereby indicating that action such as a reset of the circuit breaker may be needed.

In some situations, train 102 may travel through several different geographic regions and encounter different operating conditions in each region. For example, different regions may be associated with varying track conditions, steeper or flatter grades, speed restrictions, noise restrictions, and/or other such conditions. Some operating conditions in a given geographic region may also change over time as, for example, track rails wear and speed and/or noise restrictions are implemented or changed. Other circumstantial conditions, such as distances between sidings, distances from rail yards, limitations on access to maintenance resources, and other such considerations may vary throughout the course of mission. Operators may therefore wish to implement certain control parameters in certain geographic regions to address particular operating conditions.

To help operators implement desired control strategies based on the geographic location of the train 102, the on-board controller 200 may be configured to include a graphical user interface (GUI) that allows operators and/or other users to establish and define the parameters of geo-fences along a travel route. A geo-fence is a virtual barrier that may be set up in a software program and used in conjunction with global positioning systems (GPS) or radio frequency identification (RFID) to define geographical boundaries. As an example, a geo-fence may be defined along a length of track that has a grade greater than a certain threshold. A first geo-fence may define a no-stop zone, where the track grade is so steep that a train will not be able to traverse the length of track encompassed by the first geo-fence if allowed to stop. A second geo-fence may define an unfavorable-stop zone, where the grade is steep enough that a train stopping in the unfavorable-stop zone may be able to traverse the second geo-fence after a stop, but will miss a trip objective such as arriving at a destination by a certain time. A third geo-fence may define a favorable-stop zone, where the grade of the track is small enough that the train will be able to come to a complete stop within the favorable-stop zone for reasons such as repair or adjustment of various components or subsystems, and then resume travel and traverse the third geo-fence while meeting all trip objectives.

The remote controller interface 104 may include a GUI configured to display information and receive user inputs associated with the train. The GUI may be a graphic display tool including menus (e.g., drop-down menus), modules, buttons, soft keys, toolbars, text boxes, field boxes, windows, and other means to facilitate the conveyance and transfer of information between a user and remote controller interface 104, 204. Access to the GUI may require user authentication, such as, for example, a username, a password, a pin number, an electromagnetic passkey, etc., to display certain information and/or functionalities of the GUI.

The energy management system 232 of the controller 200 on-board a lead locomotive 208 may be configured to automatically determine one or more of throttle requests, dynamic braking requests, and pneumatic braking requests 234 for one or more of the powered and non-powered units of the train. The energy management system 232 may be configured to make these various requests based on a variety of measured operational parameters, track conditions, freight loads, trip plans, and predetermined maps, including predetermined easing functions of tractive effort vs. time, or other stored data with a goal of improving one or more of in-train forces, safety, timeliness, overall fuel economy and emissions output for individual locomotives, consists, or the entire train. Some of the measured operational parameters such as track grade or other track conditions may be associated with one or more predetermined geo-fences. The cab of the lead locomotive 208 in each of the consists 114, 140 along the train 102 may also house a plurality of input devices, operational control devices, and control system interfaces. The input devices may be used by an operator to manually control the locomotive, or the operational control devices may be controlled electronically via messages received from off-board the train. The input devices and operational control devices may include, among other things, an engine run/isolation switch, a generator field switch, an automatic brake handle (for the entire train and locomotives), an independent brake handle (for the locomotive only), a lockout device, and any number of circuit breakers. Manual input devices may include switches, levers, pedals, wheels, knobs, push-pull devices, and touch screen displays. The controller 200 may also include a microprocessor-based locomotive control system 237 having at least one programmable logic controller (PLC), a cab electronics system 238, and an electronic air (pneumatic) brake system 236, all mounted within a cab of the locomotive. The cab electronics system 238 may comprise at least one integrated display computer configured to receive and display data from the outputs of one or more of machine gauges, indicators, sensors, and controls. The cab electronics system 238 may be configured to process and integrate the received data, receive command signals from the off-board remote controller interface 204, and communicate commands such as throttle, dynamic braking, and pneumatic braking commands 233 to the microprocessor-based locomotive control system 237.

The microprocessor-based locomotive control system 237 may be communicatively coupled with the traction motors, engines, generators, braking subsystems, input devices, actuators, circuit breakers, and other devices and hardware used to control operation of various components and subsystems on the locomotive. In various alternative implementations of this disclosure, some operating commands, such as throttle and dynamic braking commands, may be communicated from the cab electronics system 238 to the locomotive control system 237, and other operating commands, such as braking commands, may be communicated from the cab electronics system 238 to a separate electronic air brake system 236. One of ordinary skill in the art will recognize that the various functions performed by the locomotive control system 237 and electronic air brake system 236 may be performed by one or more processing modules or controllers through the use of hardware, software, firmware, or various combinations thereof. Examples of the types of controls that may be performed by the locomotive control system 237 may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the locomotive control system 237 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated off-board to the remote controller interface 204.

In the case of battery electric locomotives, the locomotive control system 237 may be configured to monitor battery SOH, battery SOC, number of charge cycles for each battery or each battery cell, and battery cell temperatures. The battery SOH is a "measurement" that reflects the general condition of a battery and its ability to deliver a specified performance compared with a fresh battery. SOH takes into account such factors as charge acceptance, internal resistance, voltage and self-discharge. It is a measure of the long term capability of the battery and gives an "indication," not an absolute measurement, of how much of the available "lifetime energy throughput" of the battery has been consumed, and how much is left.

The SOC of a battery represents the short-term capability of the battery. During the lifetime of a battery, its performance or "health" tends to deteriorate gradually due to irreversible physical and chemical changes which take place with usage and with age until eventually the battery is no longer usable or dead. The SOH is an indication of the point which has been reached in the life cycle of the battery and a measure of its condition relative to a fresh battery. Unlike the SOC which can be determined by measuring the actual charge in the battery, there is no absolute definition of the SOH. It is a subjective measure in that different people derive it from a variety of different measurable battery performance parameters which they interpret according to their own set of rules. It is an estimation rather than a measurement, but preferably an estimation based on a consistent set of rules using comparable test equipment and methods. The SOH, as described herein, only applies to batteries after they have started their aging process either on the shelf or once they have entered service. The SOH definitions are therefore specified by test equipment manufacturers or by the user.

The SOH of a battery may be used to provide an indication of the performance which can be expected from the battery in its current condition or to provide an indication of how much of the useful lifetime of the battery has been consumed and how much remains before it must be replaced. In critical applications, such as on a train operating in remote territories far from maintenance facilities, the SOC gives an indication of whether a battery will be able to support the load and achieve a desired range when called upon to do so. Knowledge of the SOH will also help to anticipate problems to make fault diagnosis or to plan replacement or servicing. SOH is essentially a monitoring function tracking the long-term changes in the battery.

Any parameter which changes significantly with age, such as cell impedance or conductance, or cell temperatures can be used as a basis for providing an indication of the SOH of the cell. Changes to these parameters will normally signify that other changes have occurred which may be of more importance to the user. These could be changes to the external battery performance such as the loss of rated capacity or increased temperature rise during operation or internal changes such as corrosion. Because the SOH indication is relative to the condition of a new battery, the measurement system should retain a record of the initial conditions or at least a set of standard conditions. Thus, if cell impedance is the parameter being monitored, the system must keep in memory as a reference, a record of the initial impedance of a fresh cell. If counting the charge/discharge cycles of the battery is used as a measure of the battery usage, the expected battery cycle life of a new cell would be used as the reference. In a Lithium-ion battery, since the cell capacity deteriorates approximately linearly with age or cycle life, the expired, or remaining cycle life, depending on the definition used, is often used as a measure of the SOH. Impedance or the cell conductance may also be used. In pursuit of accuracy, several cell parameters may be measured, all of which vary with the age of the battery, and an estimation of the SOH may be derived from a combination of these factors. Examples are capacity, internal resistance, self-discharge, charge acceptance, discharge capabilities, the mobility of electrolyte, and cycle counting if possible. The absolute readings will depend on the cell chemistry involved. Weighting or a predetermined number of "points" may be added to individual factors based on experience, the cell chemistry and the importance the particular parameter has in the application for which the battery is used, with more points being assigned to more important parameters. If any of these variables provide marginal readings, the end result will be affected. In one example, a battery may have a good capacity but the internal resistance may be high. In this case, the SOH estimation will be lowered accordingly. A subtraction of points (or number of "demerit" points) may result if the battery has high self-discharge or exhibits other chemical deficiencies. The total points scored for a cell may be compared with the total number of points assigned to a new cell to give a percentage result or figure of merit. Such complex measurements and processing may be performed by one or more processors of controllers used in performing various methods according to embodiments of this disclosure. Some embodiments may also employ machine learning or other artificial intelligence techniques to derive more useful indications of SOH for a battery.

An alternative method of specifying the SOH is to base the estimation on the usage history of the battery rather than on some measured parameter. The number of charge-discharge cycles completed by the battery is one measure, although this may not account for any extreme operating conditions experienced by the battery which may have affected its functionality. It is however possible to record the duration of any periods during which the battery has been subject to abuse from out of tolerance voltages, currents or temperatures as well as the magnitude of the deviations. From this data a figure of merit representing the SOH can be determined by using a weighted average of the measured parameters. Battery usage data can be stored in memory and downloaded when required.

The at least one PLC of the locomotive control system 237 may also be configurable to receive one or more command signals indicative of at least one of a throttle command, a dynamic braking readiness command, and an air brake command 233, and output one or more corresponding command control signals configured to at least one of change a throttle position, activate or deactivate dynamic braking, and apply or release a pneumatic brake, respectively.

The cab electronics system 238 may provide integrated computer processing and display capabilities on-board the train 102, and may be communicatively coupled with a plurality of cab gauges, indicators, and sensors, as well as being configured to receive commands from the remote controller interface 204. The cab electronics system 238 may be configured to process outputs from one or more of the gauges, indicators, and sensors, and supply commands to the locomotive control system 237. In various implementations, the remote controller interface 204 may comprise a distributed system of servers, on-board and/or off-board the train, or a single laptop, hand-held device, or other computing device or server with software, encryption capabilities, and Internet access for communicating with the on-board controller 200 of the lead locomotive 208 of a lead consist and the lead locomotive 248 of a trailing consist. Control command signals generated by the cab electronics system 238 on the lead locomotive 208 of the lead consist may be communicated to the locomotive control system 237 of the lead locomotive of the lead consist, and may be communicated in parallel via a WiFi/cellular modem 250 off-board to the remote controller interface 204. The lead communication unit 120 on-board the lead locomotive of the lead consist may include the WiFi/cellular modem 250 and any other communication equipment required to modulate and transmit the command signals off-board the locomotive and receive command signals on-board the locomotive. As shown in FIG. 2, the remote controller interface 204 may relay commands received from the lead locomotive 208 via another WiFi/cellular modem 250 to another cab electronics system 238 on-board the lead locomotive 248 of the trailing consist.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the remote controller interface 104, 204. Numerous commercially available microprocessors can be configured to perform the functions of these components. Various known circuits may be associated with these components, including power supply circuitry, signalconditioning circuitry, actuator driver circuitry (i.e., circuitry powering solenoids, motors, or piezo actuators), and communication circuitry.

The locomotives 208, 248 may be outfitted with any number and type of sensors known in the art for generating signals indicative of associated operating parameters. In one example, a locomotive 208, 248 may include a temperature sensor configured to generate a signal indicative of a coolant temperature of an engine on-board the locomotive. Additionally or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system 238 for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component or operational control device to the run state) and/or remotely from off-board the locomotive (e.g., in response to control command signals received from the remote controller interface 204.) When triggered from off-board the locomotive, a corresponding command signal used to initiate operation of the warning device may be communicated to the on-board controller 200 and the cab electronics system 238.

The on-board controller 200 and the off-board remote controller interface 204 may include any means for monitoring, recording, storing, indexing, processing, and/or communicating various operational aspects of the locomotive 208, 248. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote controller interface 204 may be configured to execute instructions stored on non-transitory computer readable medium to perform methods of remote control of the locomotive 230. That is, as will be described in more detail in the following section, on-board control (manual and/or autonomous control) of some operations of the locomotive (e.g., operations of traction motors, engine (s), circuit breakers, etc.) may be selectively overridden by the off-board remote controller interface 204.

Remote control of the various powered and non-powered units on the train 102 through communication between the on-board cab electronics system 238 and the off-board remote controller interface 204 may be facilitated via the various communication units 120, 126, 160, 166 spaced along the train 102. The communication units may include hardware and/or software that enables sending and receiving of data messages between the powered units of the train and the off-board remote controller interfaces. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote controller interfaces and the various components and subsystems of the train 102.

As shown in the exemplary embodiment of FIG. 2, the cab electronics system 238 may be configured to receive the requests 234 after they have been processed by a locomotive interface gateway (LIG) 235, which may also enable modulation and communication of the requests through a WiFi/cellular modem 250 to the off-board remote controller interface (back office) 204. The cab electronics system 238 may be configured to communicate commands (e.g., throttle, dynamic braking, and braking commands 233) to the locomotive control system 237 and an electronic air brake system 236 on-board the lead locomotive 208 in order to autonomously control the movements and/or operations of the lead locomotive.

In parallel with communicating commands to the locomotive control system 237 of the lead locomotive 208, the cab electronics system 238 on-board the lead locomotive 208 of the lead consist may also communicate commands to the off-board remote controller interface 204. The commands may be communicated either directly or through the locomotive interface gateway 235, via the WiFi/cellular modem 250, off-board the lead locomotive 208 of the lead consist to the remote controller interface 204. The remote controller interface 204 may then communicate the commands received from the lead locomotive 208 to the trailing consist lead locomotive 248. The commands may be received at the trailing consist lead locomotive 248 via another WiFi/cellular modem 250, and communicated either directly or through another locomotive interface gateway 235 to a cab electronics system 238. The cab electronics system 238 on-board the trailing consist lead locomotive 248 may be configured to communicate the commands received from the lead locomotive 208 of the lead consist to a locomotive control system 237 and an electronic air brake system 236 on-board the trailing consist lead locomotive 248. The commands from the lead locomotive 208 of the lead consist may also be communicated via the network connection 118 from the trailing consist lead locomotive 248 to one or more trailing powered units 150 of the trailing consist 140. The result of configuring all of the lead powered units of the lead and trailing consists to communicate via the off-board remote controller interface 204 is that the lead powered unit of each trailing consist may respond quickly and in close coordination with commands responded to by the lead powered unit of the lead consist. Additionally, each of the powered units in various consists along a long train may quickly and reliably receive commands such as throttle, dynamic braking, and pneumatic braking commands 234 initiated by a lead locomotive in a lead consist regardless of location and conditions. In alternative embodiments, including in the case of a trailing battery electric locomotive, non-standard communication channels may be provided over or in parallel to the standard 27 pin MU trainline forming the network connection 118 between a lead diesel-electric locomotive and the trailing battery electric locomotive. The energy management system 232 may be configured to communicate notch commands for a trailing diesel-electric locomotive in conjunction with one or more predetermined easing functions of tractive effort vs. time to be implemented by control of one of more battery electric locomotives such that the total tractive effort from the trailing locomotives follows a minimum jerk trajectory, thereby minimizing in-train forces.

The integrated cab electronics systems 238 on the powered units of the lead consist 114 and on the powered units of the trailing consist 140 may also be configured to receive and generate commands for configuring or reconfiguring various switches, handles, and other operational control devices on-board each of the powered units of the train as required before the train begins on a journey, or after a failure occurs that requires reconfiguring of all or some of the powered units. Examples of switches and handles that may require configuring or reconfiguring before a journey or after a failure may include an engine run switch, a generator field switch, an automatic brake handle, and an independent brake handle. Remotely controlled actuators on-board the powered units in association with each of the switches and handles may enable remote, autonomous configuring and reconfiguring of each of the devices. For example, before the train begins a journey, or after a critical failure has occurred on one of the lead or trailing powered units, commands may be sent from the off-board remote controller interface 204 to any powered unit in order to automatically reconfigure all of the switches and handles as required on-board each powered unit without requiring an operator to be on-board the train. Following the reconfiguring of all of the various switches and handles on-board each locomotive, the remote controller interface may also send messages to the cab electronics systems on-board each locomotive appropriate for generating other operational commands such as changing throttle settings, activating or deactivating dynamic braking, and applying or releasing pneumatic brakes. This capability saves the time and expense of having to delay the train while sending an operator to each of the powered units on the train to physically switch and reconfigure all of the devices required.

Figure 3:
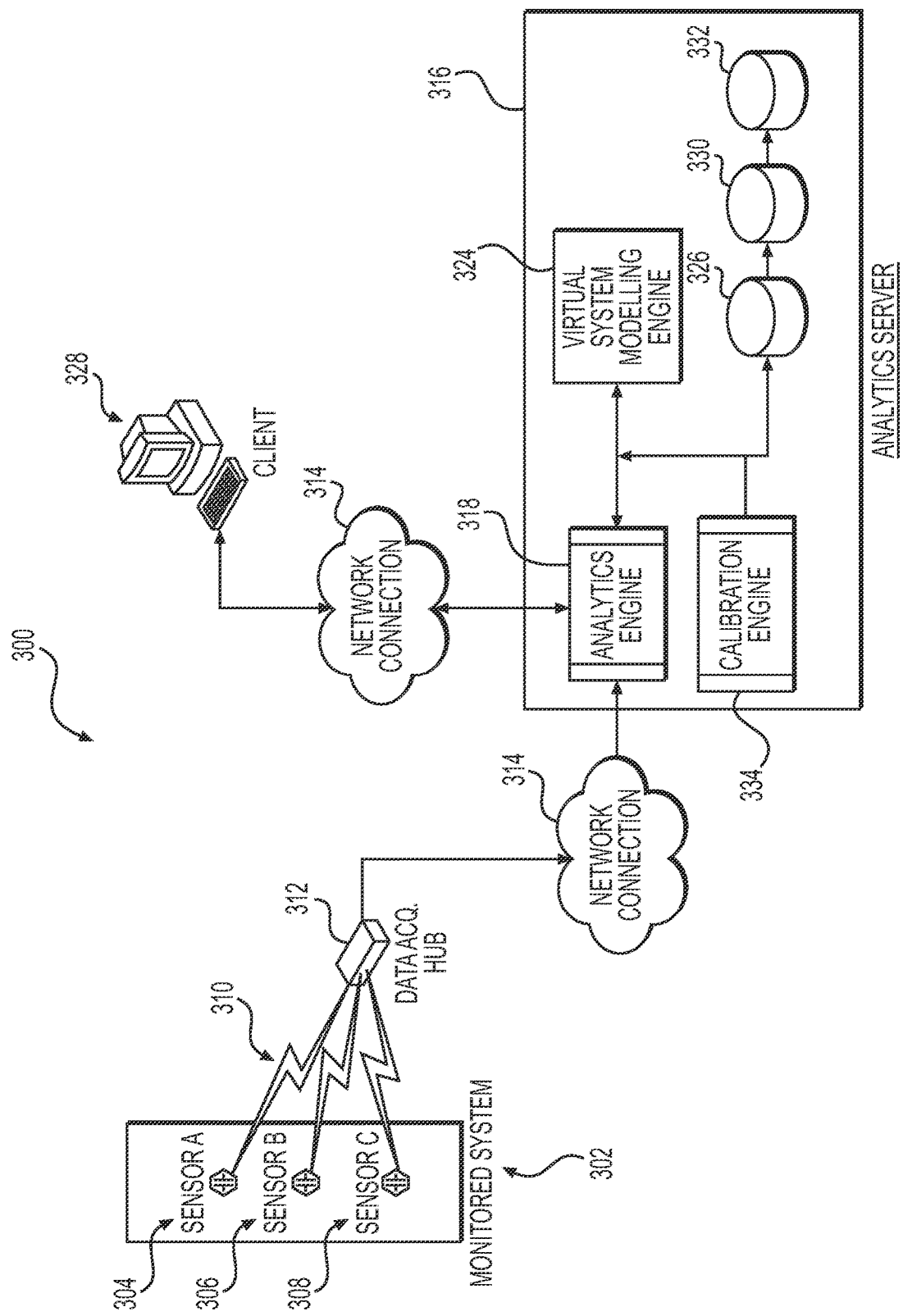
FIG. 3 is an illustration of a system for utilizing real-time and historical data for predictive analysis of the performance of a monitored system, in accordance with one embodiment.

FIG. 3 is an illustration of a system according to an exemplary embodiment of this disclosure for utilizing real-time data for predictive analysis of the performance of a monitored computer system, such as train control system 100 shown in FIG. 1. The system 300 may include a series of sensors (e.g., Sensor A 304, Sensor B 306, Sensor C 308) interfaced with the various components of a monitored system 302, a data acquisition hub 312, an analytics server 316, and a client device 328. The monitored system 302 may include one or more of the train control systems illustrated in FIG. 2, such as an energy management system, a cab electronics system, and a locomotive control system. It should be understood that the monitored system 302 can be any combination of components whose operations can be monitored with sensors and where each component interacts with or is related to at least one other component within the combination. For a monitored system 302 that is a train control system for a diesel-electric locomotive, the sensors may include brake temperature sensors, exhaust sensors, fuel level sensors, pressure sensors, stress sensors, knock sensors, reductant level or temperature sensors, generator power output sensors, voltage or current sensors, speed sensors, motion detection sensors, location sensors, wheel temperature or bearing temperature sensors, or any other sensor known in the art for monitoring various train operational parameters and train component structural characteristics. A different set of sensors for producing signals indicative of battery SOH, battery SOC, number of charge cycles for a battery or battery cell, battery cell temperatures, etc. may be included in the case of a battery electric locomotive.

The sensors are configured to provide output values for system parameters that indicate the operational status and/or "health" of the monitored system 302. The sensors may include sensors for monitoring the operational status and/or health of the various physical systems, batteries, and/or electrical systems associated with operation of a train, as well as the operational status of the various computer systems and subsystems associated with operation of the train. The sensors may also be configured to measure additional data that can affect system operation. For example, sensor output can include environmental information, e.g., temperature, humidity, etc., which can impact the operation and efficiency of the various train control systems.

In one exemplary embodiment, the various sensors 304, 306, 308 may be configured to output data in an analog format. For example, electrical power sensor measurements (e.g., voltage, current, etc.) are sometimes conveyed in an analog format as the measurements may be continuous in both time and amplitude. In another embodiment, the sensors may be configured to output data in a digital format. For example, the same electrical power sensor measurements may be taken in discrete time increments that are not continuous in time or amplitude. In still another embodiment, the sensors may be configured to output data in either an analog or digital format depending on the sampling requirements of the monitored system 302.

The sensors can be configured to capture output data at split-second intervals to effectuate "real-time" data capture. For example, in one embodiment, the sensors can be configured to generate hundreds of thousands of data readings per second. It should be appreciated, however, that the number of data output readings taken by a sensor may be set to any value as long as the operational limits of the sensor and the data processing capabilities of the data acquisition hub 312 are not exceeded.

Each sensor may be communicatively connected to the data acquisition hub 312 via an analog or digital data connection 310. The data acquisition hub 312 may be a standalone unit or integrated within the analytics server 316 and can be embodied as a piece of hardware, software, or some combination thereof. In one embodiment, the data connection 310 is a "hard wired" physical data connection (e.g., serial, network, etc.). For example, a serial or parallel cable connection between the sensor and the hub 312. In another embodiment, the data connection 310 is a wireless data connection. For example, a 5G radio frequency (RF) cellular connection, BLUETOOTH™, infrared or equivalent connection between the sensor and the hub 312.

The data acquisition hub 312 may be configured to communicate "real-time" data from the monitored system 302 to the analytics server 316 using a network connection 314. In one embodiment, the network connection 314 is a "hardwired" physical connection. For example, the data acquisition hub 312 may be communicatively connected (via Category 5 (CAT5), fiber optic or equivalent cabling) to a data server (not shown) that is communicatively connected (via CAT5, fiber optic or equivalent cabling) through the Internet and to the analytics server 316 server, the analytics server 316 being also communicatively connected with the Internet (via CAT5, fiber optic, or equivalent cabling). In another embodiment, the network connection 314 is a wireless network connection (e.g., 5G cellular, Wi-Fi, WLAN, etc.). For example, utilizing an 802.11a/b/g or equivalent transmission format. In practice, the network connection utilized is dependent upon the particular requirements of the monitored system 302. Data acquisition hub 312 may also be configured to supply warning and alarms signals as well as control signals to monitored system 302 and/or sensors 304, 306, and 308 as described in more detail below.

As shown in FIG. 3, in one embodiment, the analytics server 316 may host an analytics engine 318, a virtual system modeling engine 324, a calibration engine 334, and several databases 326, 330, and 332. Additional engines or processing modules may also be included in analytics server 316, such as an operator behavior modeling engine, a simulation engine, and other machine learning or artificial intelligence engines or processing modules. The virtual system modeling engine 324 can be, e.g., a computer modeling system. In this context, the modeling engine can be used to precisely model and mirror the actual train control systems and subsystems. Analytics engine 318 can be configured to generate predicted data for the monitored systems and analyze differences between the predicted data and the real-time data received from data acquisition hub 312. Analytics server 316 may be interfaced with a monitored train control system 302 via sensors, e.g., sensors 304, 306, and 308. The various sensors are configured to supply real-time data from the various physical components and computer systems and subsystems of train 102. The real-time data is communicated to analytics server 316 via data acquisition hub 312 and network 314. Hub 312 can be configured to provide real-time data to analytics server 316 as well as alarming, sensing and control featured for the monitored system 302, such as the train control system 100.

The real-time data from data acquisition hub 312 can be passed to a comparison engine, which can be separate from or form part of analytics engine 318. The comparison engine can be configured to continuously compare the real-time data with predicted values generated by virtual system modeling engine 324 or another simulation engine included as part of analytics server 316. Based on the comparison, the comparison engine can be further configured to determine whether deviations between the real-time values and the expected values exist, and if so to classify the deviation, e.g., high, marginal, low, etc. The deviation level can then be communicated to a decision engine, which can also be included as part of analytics engine 318 or as a separate processing module. The decision engine can be configured to look for significant deviations between the predicted values and real-time values as received from the comparison engine. If significant deviations are detected, the decision engine can also be configured to determine whether an alarm condition exists, activate the alarm and communicate the alarm to a Human-Machine Interface (HMI) for display in real-time via, e.g., client 328. The decision engine of analytics engine 318 can also be configured to perform root cause analysis for significant deviations in order to determine the interdependencies and identify any failure relationships that may be occurring. The decision engine can also be configured to determine health and performance levels and indicate these levels for the various processes and equipment via the HMI of client 328. All of which, when combined with the analytical and machine learning capabilities of analytics engine 318 allows the operator to minimize the risk of catastrophic equipment failure by predicting future failures and providing prompt, informative information concerning potential/predicted failures before they occur. Avoiding catastrophic failures reduces risk and cost and maximizes facility performance and up time.

A simulation engine that may be included as part of analytics server 316 may operate on complex logical models of the various control systems and subsystems of on-board controller 200 and train control system 100. These models may be continuously and automatically synchronized with the actual status of the control systems based on the real-time data provided by the data acquisition hub 312 to analytics server 316. In other words, the models are updated based on current switch status, breaker status, e.g., open-closed, equipment on/off status, etc. Thus, the models are automatically updated based on such status, which allows a simulation engine to produce predicted data based on the current train operational status. This in turn, allows accurate and meaningful comparisons of the real-time data to the predicted data. Example models that can be maintained and used by analytics server 316 may include models used to calculate train trip optimization, determine component operational requirements for improved asset life expectancy, determine efficient allocation and utilization of computer control systems and computer resources, etc. In certain embodiments, data acquisition hub 312 may also be configured to supply equipment identification associated with the real-time data. This identification can be cross referenced with identifications provided in the models.

In one embodiment, if a comparison performed by a comparison engine indicates that a differential between a real-time sensor output value and an expected value exceeds a threshold value but remains below an alarm condition (i.e., alarm threshold value), a calibration request may be generated by the analytics engine 318. If the differential exceeds the alarm threshold value, an alarm or notification message may be generated by the analytics engine 318. The alarm or notification message may be sent directly to the client (i.e., user) 328 for display in real-time on a web browser, pop-up message box, e-mail, or equivalent on the client 328 display panel. In another embodiment, the alarm or notification message may be sent to a wireless mobile device to be displayed for the user by way of a wireless router or equivalent device interfaced with the analytics server 316. The alarm can be indicative of a need for a repair event or maintenance, such as synchronization of any computer control systems that are no longer communicating within allowable latency parameters. The responsiveness, calibration, and synchronization of various computer systems can also be tracked by comparing expected operational characteristics based on historical data associated with the various systems and subsystems of the train to actual characteristics measured after implementation of control commands, or by comparing actual measured parameters to predicted parameters under different operating conditions.

Virtual system modeling engine 324 may create multiple models that can be stored in the virtual system model database 326. Machine learning algorithms may be employed by virtual system modeling engine 324 to create a variety of virtual model applications based on real time and historical data gathered by data acquisition hub 314 from a large variety of sensors measuring operational parameters of train 102. The virtual system models may include components for modeling reliability of various train physical systems and distributed computer control systems. In addition, the virtual system models created by virtual system modeling engine 324 may include dynamic control logic that permits a user to configure the models by specifying control algorithms and logic blocks in addition to combinations and interconnections of train operational components and control systems. Virtual system model database 326 can be configured to store the virtual system models and perform what-if simulations. In other words, the database of virtual system models can be used to allow a system designer to make hypothetical changes to the train control systems and test the resulting effect, without having to actually take the train out of service or perform costly and time consuming analysis. Such hypothetical simulations performed by virtual systems modeling engine 324 can be used to learn failure patterns and signatures as well as to test proposed modifications, upgrades, and additions, for the train control system. The real-time data, as well as detected trends and patterns produced by analytics engine 318 can be stored in real-time data acquisition databases 330 and 332. Examples of hypothetical simulations that could be performed by virtual systems modeling engine 324 may include simulations of in-train forces over time when combining standard notch commands and the resulting predicted tractive effort vs. time for one or more diesel-electric locomotives in one or more consists with various predetermined or real time easing functions of tractive effort vs. time achievable by one or more battery electric locomotives.

As discussed above, the virtual system model may be periodically calibrated and synchronized with "real-time" sensor data outputs so that the virtual system model provides data output values that are consistent with the actual "real-time" values received from the sensor output signals. Unlike conventional systems that use virtual system models primarily for system design and implementation purposes (i.e., offline simulation and facility planning), the virtual system train control models or other virtual computer system models described herein may be updated and calibrated with the real-time system operational data to provide better predictive output values. A divergence between the real-time sensor output values and the predicted output values may generate either an alarm condition for the values in question and/or a calibration request that is sent to a calibration engine 334.

A train control system according to an exemplary embodiment of this disclosure may use machine learning for controlling the ramp rate at which a train accelerates after braking, such as when the train is transitioning from dynamic braking after traveling down a long hill and ramping up acceleration as the train then travels up an adjacent hill. The train control system may include data acquisition hub 312 communicatively connected to one or more of sensors and databases associated with one or more locomotives or other components of the train and configured to acquire real-time and historical operational and structural data for use as training data from one or more of systems and components of the train. Virtual system modeling engine 324 may be configured to simulate in-train forces and train operational characteristics using physics-based equations, kinematic or dynamic modeling of behavior of the train or components of the train during operation when the consist is changing speed, and inputs derived from stored historical contextual data. The stored historical contextual data may include one or more of a number of locomotives in the train, age or amount of usage of one or more locomotives of the train or other components of the train, weight distribution of the train, length of the train, speed of the train, control configurations for one or more locomotives or consists of the train, power notch settings of one or more locomotives of the train, braking implemented in the train, positive train control characteristics implemented in the train, grade, temperature, or other characteristics of train tracks on which the train is operating, and engine operational parameters that affect performance of one or more locomotive engines for the train.

Virtual system model database 326 may be configured to store one or more virtual system models simulated by virtual system modeling engine 324, wherein each of the one or more virtual system models includes a mapping between different combinations of the stored historical contextual data and corresponding simulated in-train forces and train operational characteristics that occur when the consist is changing speed. Real-time and historical operational and structural data acquired by data acquisition hub 312 for use as training data may include one or more of structural stresses on one or more couplers interconnecting one or more of locomotives and non-powered rail cars of the train, and measured vibrations of engine components caused by harmonic nodes encountered while ramping up power output of one or more of the locomotive engines of the train A machine learning engine of the train control system may be configured to calculate relative weights to assign to each of different types of the stored historical contextual data of each of the one or more virtual system models and assign the relative weights to the stored historical contextual data. The machine learning engine may also be configured to train a learning system using the weighted stored historical contextual data and the training data to determine a probability of each of the one or more virtual system models providing an accurate representation of actual in-train forces and train operational characteristics that occur during acceleration of the train after braking using a learning function including at least one learning parameter. Training the learning system may include providing the weighted stored historical contextual data as an input to the learning function, the learning function being configured to use the at least one learning parameter to generate an output based on the input and cause the learning function to generate the output based on the input. The training may further include comparing the output to the training data, wherein the training data includes data produced by sensors having captured actual information on in-train forces and train operational characteristics during acceleration of the train after braking. The training may include comparing the determined probabilities of each of the virtual system models to a predetermined threshold probability level, and initiating adjustments to one or more of the calculated relative weights assigned to each of the different types of the stored historical contextual data of each of the one or more virtual system models to improve the determined probabilities of each of the virtual system models based on actual information on in-train forces and train operational characteristics acquired from a plurality of different trains operating under different conditions. In some embodiments of a machine learning engine according to this disclosure, the machine learning engine may also be configurable by a user in order to adjust the relative weights that are assigned to each of different types of the stored historical contextual data of each of the one or more virtual system models. Additionally, one or more of the predetermined acceptable ranges of values for simulated in-train forces and train operational characteristics may be configurable by the user.

Energy management system 232 may be associated with one or more locomotives of the train and configured to adjust one or more of throttle requests, dynamic braking requests, and pneumatic braking requests for the one or more locomotives of the train based at least in part on one of the virtual system models with the highest probability of providing an accurate representation of actual in-train forces and train operational characteristics. The adjustments made by energy management system 232 may also be determined such that one or more of the simulated in-train forces and train operational characteristics fall within a predetermined acceptable range of values.

Analytics engine 318 and virtual system modeling engine 324 may be configured to implement pattern/sequence recognition into a real-time decision loop that, e.g., is enabled by machine learning. The types of machine learning implemented by the various engines of analytics server 316 may include various approaches to learning and pattern recognition. The machine learning may include the implementation of associative memory, which allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 318 is also better able to understand component mean time to failure rates through observation and system availability characteristics. This technology in combination with the virtual system model can present a novel way to digest and comprehend alarms in a manageable and coherent way.

The machine learning algorithms assist in uncovering the patterns and sequencing of alarms to help pinpoint the location and cause of any actual or impending failures of physical systems or computer systems. Typically, responding to the types of alarms that may be encountered when operating a train is done manually by experts who have gained familiarity with the system through years of experience. However, at times, the amount of information is so great that an individual cannot respond fast enough or does not have the necessary expertise. An "intelligent" system employing machine learning algorithms that observe human operator actions and recommend possible responses could improve train operational safety by supporting an existing operator, or even managing the various train control systems autonomously. Current simulation approaches for maintaining transient stability and synchronization between the various train control systems may involve traditional numerical techniques that typically do not test all possible scenarios. The problem is further complicated as the numbers of components and pathways increase. Through the application of the machine learning algorithms and virtual system modeling according to various embodiments of this disclosure, by observing simulations of various outcomes determined by different train control inputs and operational parameters, and by comparing them to actual system responses, it may be possible to improve the simulation process, thereby improving the overall design of future train control systems.

The virtual system model database 326, as well as databases 330 and 332, can be configured to store one or more virtual system models, virtual simulation models, and real-time data values, each customized to a particular system being monitored by the analytics server 316. Thus, the analytics server 316 can be utilized to monitor more than one train control system or other computer system associated with the train at a time. As depicted herein, the databases 326, 330, and 332 can be hosted on the analytics server 316 and communicatively interfaced with the analytics engine 318. In other embodiments, databases 326, 330, and 332 can be hosted on one or more separate database servers (not shown) that are communicatively connected to the analytics server 316 in a manner that allows the virtual system modeling engine 324 and analytics engine 318 to access the databases as needed. In one embodiment, the client 328 may modify the virtual system model stored on the virtual system model database 326 by using a virtual system model development interface including well-known modeling tools that are separate from the other network interfaces. For example, dedicated software applications that run in conjunction with the network interface may allow a client 328 to create or modify the virtual system models.

The client 328 may utilize a variety of network interfaces (e.g., web browsers) to access, configure, and modify the sensors (e.g., configuration files, etc.), analytics engine 318 (e.g., configuration files, analytics logic, etc.), calibration parameters (e.g., configuration files, calibration logic, etc.), virtual system modeling engine 324 (e.g., configuration files, simulation parameters, etc.) and virtual system model of the various train control systems under management (e.g., virtual system model operating parameters and configuration files). Correspondingly, data from those various components of the monitored system 302 can be displayed on a client 328 display panel for viewing by a system administrator or equivalent. As described above, analytics server 316 may be configured to synchronize and/or calibrate the various train control systems and subsystems in the physical world with virtual and/or simulated models and report, e.g., via visual, real-time display, deviations between the two as well as system health, alarm conditions, predicted failures, etc. In the physical world, sensors 304, 306, 308 produce real-time data for the various train control processes and equipment that make up the monitored system 302. In the virtual world, simulations generated by the virtual system modeling engine 324 may provide predicted values, which are correlated and synchronized with the real-time data. The real-time data can then be compared to the predicted values so that differences can be detected. The significance of these differences can be determined to characterize the health status of the various train control systems and subsystems. The health status can then be communicated to a user on-board the train or off-board at a remote-control facility via alarms and indicators, as well as to client 328, e.g., via web pages.

In some embodiments, as discussed above, the analytics engine 318 may include a machine learning engine. The machine learning engine may include a train control strategy engine configured to receive training data from a data acquisition hub communicatively coupled to one or more sensors associated with one or more locomotives of a train. The training data may include real-time configuration and operational data and may be communicated to the data acquisition hub and to the machine learning engine over wireless and/or wired networks. The training data may be relevant to train control operations, including a plurality of first input conditions and a plurality of first response maneuvers, outputs, or first actions to be taken by an operator of the train associated with the first input conditions. The training data may include historical operational data acquired by various sensors associated with one or more locomotives of the train during one or more actual train runs. The training data may also include data indicative of specific actions taken by a train operator, or directly or indirectly resulting from actions taken by the train operator, under a large variety of operating conditions, and on trains with the same or different equipment, different operational characteristics, and different parameters. The machine learning engine and train control strategy engine may be configured to train a learning system using the training data to generate a second response maneuver or second action to be taken by the train operator based on a second input condition.

The response maneuvers generated by the machine learning engine may be integrated with and implemented by various train control systems and subsystems, such as the cab electronics system 238, and locomotive control system 237 shown in FIG. 2. The resultant controls performed by the various train control systems and subsystems based on outputs from the machine learning engine may improve the operation of trains that are being operated fully manually, semi-autonomously, or fully autonomously by enabling a shared mental model of train operator behavior between experienced human train operators or engineers, less experienced engineers, and autonomous or semi-autonomous train control systems. For example, a learning system according to various embodiments of this disclosure can be trained to learn how experienced human engineers respond to different inputs under various operating conditions, such as during the automatic implementation of train control commands by trip optimizer programs, positive train control (PTC) algorithms, and automatic train operations (ATO), during extreme weather conditions, during emergency conditions caused by other train traffic or equipment failure on the train, while approaching and maneuvering in train yards, and under other train operating conditions. The trained learning system can then improve train control systems being operated by less experienced engineers, semi-autonomously, or fully autonomously to perform operational maneuvers in a manner consistent with how the experienced human engineers would respond under similar conditions. Unlike existing methods for maneuvering autonomous vehicles, such as by following a control law that optimizes a variable such as a throttle notch setting at the expense of performing other operational maneuvers that an experienced human engineer would readily understand, the machine learning engine disclosed herein may allow less experienced train engineers or autonomously-operated trains to execute maneuvers including selecting optimum control settings for a particular set of operational conditions that cannot be reduced to a control law. Train control systems that include a machine learning engine configured to encode real human engineer behavior into a train control strategy engine may enable less experienced train engineers, or semi-autonomously or fully autonomously operated trains to perform optimized train handling across different terrains, with different trains, and under different operating conditions.

In some embodiments, the machine learning engine of analytics engine 318 may be configured to receive training data including a plurality of first input conditions and a plurality of first response maneuvers or outputs associated with the first input conditions. The first input conditions can represent conditions which, when applied to a train operating system or when perceived by a train engineer, lead to a particular response maneuver or output being performed. A "response maneuver" as used herein, refers to any action that may be taken by a human engineer or that may directly or indirectly result from an action taken by a human engineer. An output may include any actual acquired real-time and historical operational and structural data such as data produced by sensors having captured actual information on in-train forces and train operational characteristics. The input conditions can include a state or control configuration of a particular locomotive in a consist, a representation or state of an environment surrounding the consist, including behavior of other trains or locomotives on the same or interconnected tracks in the same geographical area, and commands, instructions, or other communications received from other entities. Inputs may also be derived from stored historical contextual data comprising one or more of a number of locomotives in the train, age or amount of usage of one or more locomotives of the train or other components of the train, weight distribution of the train, length of the train, speed of the train, control configurations for one or more locomotives or consists of the train, power notch settings of one or more locomotives of the train, braking implemented in the train, positive train control characteristics implemented in the train, grade, temperature, or other characteristics of train tracks on which the train is operating, and engine operational parameters that affect performance of one or more locomotive engines for the train.

The first input conditions can include an indication of a maneuver command. A maneuver command can be a command, instruction, or other information associated with a maneuver that a locomotive is expected, desired, or required to perform. Maneuver commands can vary in specificity and may include commands specific to an exact set of tracks along which the locomotive is required to travel to reach a general objective, specific throttle notch settings for one or more lead and/or trailing locomotives at different locations, under different loads or trip parameters, easing functions of tractive effort vs. time to be implemented by one or more battery electric locomotives, braking and dynamic braking commands, and other control settings to be implemented by the cab electronics system, throttle, dynamic braking and braking commands, and the locomotive control system.

The machine learning engine may be configured to train a learning system using the training data to generate a second response maneuver or output based on a second input condition. The machine learning engine can provide the training data as an input to the learning system, monitor an output of the learning system, and modify the learning system based on the output. The machine learning engine can compare the output to the plurality of first response maneuvers, determine a difference between the output and the plurality of first response maneuvers, and modify the learning system based on the difference between the output and the plurality of first response maneuvers. For example, the plurality of first response maneuvers may represent a goal or objective that the machine learning engine is configured to cause the learning system to match, by modifying characteristics of the learning system until the difference between the output and the plurality of first response maneuvers is less than a threshold difference. In some embodiments, the machine learning engine can be configured to modify characteristics of the learning system to minimize a cost function or optimize some other objective function or goal, such as reduced emissions, during a particular train trip or over a plurality of trips or time periods. The machine learning engine can group the training data into a first set of training data for executing a first learning protocol, and a second set of training data for executing a second learning protocol.

The learning system can include a learning function configured to associate the plurality of input conditions to the plurality of first response maneuvers, and the learning function can define characteristics, such as a plurality of parameters. The machine learning engine can be configured to modify the plurality of parameters to decrease the difference between the output of the learning system (e.g., the output of the learning function) and the plurality of first response maneuvers. Once trained, the learning system can be configured to receive the second input condition and apply the learning function to the second input condition to generate the second response maneuver. In some embodiments, the learning system may include a neural network. The neural network can include a plurality of layers each including one or more nodes, such as a first layer (e.g., an input layer), a second layer (e.g., an output layer), and one or more hidden layers. The neural network can include characteristics such weights and biases associated with computations that can be performed between nodes of layers. The machine learning engine can be configured to train the neural network by providing the first input conditions to the first layer of the neural network. The neural network can generate a plurality of first outputs based on the first input conditions, such as by executing computations between nodes of the layers. The machine learning engine can receive the plurality of first outputs and modify a characteristic of the neural network to reduce a difference between the plurality of first outputs and the plurality of first response maneuvers.

In some embodiments, the learning system may include a classification engine, such as a support vector machine (SVM). The SVM can be configured to generate a mapping of first input conditions to first response maneuvers or first outputs. For example, the machine learning engine may be configured to train the SVM to generate one or more rules configured to classify training pairs (e.g., each first input condition and its corresponding first response maneuver or first output). The classification of training pairs can enable the mapping of first input conditions to first response maneuvers by classifying particular first response maneuvers as corresponding to particular first input conditions. Once trained, the learning system can generate the second response maneuver based on the second input condition by applying the mapping or classification to the second input condition.

Another exemplary classification engine that may be utilized in a learning system according to various implementations of this disclosure may include a decision tree based algorithm such as Random Forests® or Random Decision Forests. Decision trees may be used for classification, but also for regression problems. When training a dataset to classify a variable, the idea of a decision tree is to divide the data into smaller datasets based on a certain feature value until the target variables all fall under one category. To avoid overfitting, variations of decision tree classifiers such as a Random Forests® classifier or an AdaBoost classifier may be employed. A Random Forests® classifier fits a number of decision tree classifiers on various sub-samples of the dataset and uses averaging to improve the predictive accuracy and control over-fitting. The sub-sample sizes are always the same as the original input sample size but the samples of the original data frame are drawn with replacements (bootstrapping). An AdaBoost classifier begins by fitting a classifier on the original dataset and then fits additional copies of the classifier on the same dataset where the weights of incorrectly classified instances are adjusted such that subsequent classifier focus more on difficult cases. Yet another exemplary classification engine may include a Bayesian estimator such as a naïve Bayes classifier, which is a family of probabilistic classifiers based on applying Bayes theorem with strong (naïve) independence assumptions between the features. A naïve Bayes classifier may be trained by a family of algorithms based on a common principle, such as assuming that the value of a particular feature is independent of the value of any other feature, given the class variable. This type of classifier may also be trained effectively using supervised learning, which is a machine learning task of learning a function that maps an input to an output based on example input-output pairs. The function is inferred from labeled training data consisting of a set of training examples. Each example is a pair consisting of an input object (typically a vector) and a desired output value (also called a supervisory signal). A supervised learning algorithm analyzes the training data and produces an inferred function, which can be used for mapping new examples.

In some embodiments, the learning system may include a Markov decision process engine. The machine learning engine may be configured to train the Markov decision process engine to determine a policy based on the training data, the policy indicating, representing, or resembling how a particular locomotive would behave while controlled by an experienced human engineer in response to various input conditions. The machine learning engine can provide the first input conditions to the Markov decision process engine as a set or plurality of states (e.g., a set or plurality of finite states). The machine learning engine can provide the first response maneuvers to the Markov decision process as a set or plurality of actions (e.g., a set or plurality of finite actions). The machine learning engine can execute the Markov decision process engine to determine the policy that best represents the relationship between the first input conditions and first response maneuvers. It will be appreciated that in various embodiments, the learning system can include various other machine learning engines and algorithms, as well as combinations of machine learning engines and algorithms, that can be executed to determine a relationship between the plurality of first input conditions and the plurality of first response maneuvers and thus train the learning system.

In some implementations of this disclosure, train configuration and operational data may be provided to the machine learning engine over a 5G cellular radio frequency telecommunications network interconnecting multiple nodes of a distributed computer control system. But alternative embodiments of the present disclosure may be implemented over a variety of data communication network environments using software, hardware, or a combination of hardware and software to provide the distributed processing functions.

INDUSTRIAL APPLICABILITY

The machine learning engine and virtual system modeling engine of the present disclosure may be applicable to any grouping of vehicles such as locomotives or systems of other powered machines where remote access to particular functions of the machines may be desirable. System processing associated with such groupings of vehicles or other machines may be highly distributed as a result of recent advances and cost improvements in sensing technology and communication of large amounts of operational and configuration data acquired from sensors associated with the vehicles or other machines. Communication networks such as 5G mobile networks allow for increased bandwidths, increased throughput, and faster data speeds than many existing telecommunication technologies, thereby enabling the interconnection of large numbers of devices on mobile platforms such as vehicles, and the transmission of data from those interconnected devices at much faster speeds and with much more accuracy than currently available. These improvements in data transmission capabilities allow for the remote distribution of the various computer control systems and subsystems that were traditionally restricted to being physically located on the controlled devices, such as locomotives or other vehicles.

Distributed, remote access to the computerized systems associated with the vehicles in a train, such as control systems and computer systems monitoring the various functions performed by the control systems, enhances operational aspects such as automatic train operation (ATO) when human operators are not present or available at the locomotives, monitoring and maintenance of train equipment, and collection of data provided by various sensors and other devices during operation of the locomotives, which can be used to optimize performance, efficiency, safety, and life expectancy of the equipment. The increased amount of communication of data over wireless networks may also increase the need for systems and methods to predict or monitor for any transient latency issues in the exchange of data between various remotely distributed computer systems, and maintain synchronization of the distributed systems. Implementation of the above-discussed machine learning and pattern recognition techniques according to various embodiments of this disclosure enables the prediction, early identification, and mitigation of any latency issues during the exchange of data between the various computerized systems and subsystems.

Associative memory is built through "experiential" learning in which each newly observed state is accumulated in the associative memory as a basis for interpreting future events. The machine learning algorithms performed by analytics engine 318 assist in uncovering the patterns and sequencing of train control procedures under a large variety of operating conditions to help pinpoint the location and cause of any actual or impending failures of physical systems or computer control systems. As discussed above, train control systems that include a machine learning engine may also be configured to encode real human engineer behavior into a train control strategy engine that enables less experienced train engineers, or semi-autonomously or fully autonomously operated trains to perform optimized train handling across different terrains, with different trains, and under different operating conditions. This approach also allows for easy scalability, extensibility, or customization of train control procedures for different types of trains, different sizes of trains, different loads being carried by the trains, different weather conditions, different emissions and safety standards depending on geographical location, and different overall train operating goals.

During normal operation, a human operator may be located on-board the lead locomotive 208 and within the cab of the locomotive. The human operator may be able to control when an engine or other subsystem of the train is started or shut down, which traction motors are used to propel the locomotive, what switches, handles, and other input devices are reconfigured, and when and what circuit breakers are reset or tripped. The human operator may also be required to monitor multiple gauges, indicators, sensors, and alerts while making determinations on what controls should be initiated. However, there may be times when the operator is not available to perform these functions, when the operator is not on-board the locomotive 208, and/or when the operator is not sufficiently trained or alert to perform these functions. In addition, the distributed control systems according to this disclosure facilitate remote access to and availability of the locomotives in a train for authorized third parties, including providing redundancy and reliability of monitoring and control of the locomotives and subsystems on-board the locomotives.

A method of controlling locomotives in lead and trailing consists of a train in accordance with various aspects of this disclosure may include, for example, receiving an automatic or manually generated configuration failure signal at the off-board remote controller interface 204. The configuration failure signal may be indicative of a situation at one or more of the locomotives in the train requiring configuration or reconfiguration of various operational control devices on-board the one or more locomotives. Dispatch personnel may then initiate the transmission of a configuration command signal from a remote client 328, to the analytics engine 318 of the analytics server 316, to the remote controller interface 204, and to the one or more locomotives requiring reconfiguration. In this way, all of the locomotives in the lead and trailing consists of the train may be reconfigured in parallel without requiring an operator on-board the train. The configuration commands signals, like other messages communicated from the remote controller interface 204, may also be transmitted only to a lead locomotive in a consist, and then communicated over a wired connection such as the network connection 118 to one or more trailing locomotives in the consist. As discussed above, on-board controls of the locomotives in the train may also include the energy management system 232 providing one or more of throttle, dynamic braking, or braking requests 234 to the cab electronics system 238. The cab electronics system 238 may process and integrate these requests along with other outputs from various gauges and sensors, and commands such as the configuration command that may have been received from the off-board remote controller interface 204. The cab electronics system 238 may then communicate commands to the on-board locomotive control system 237. In parallel with these on-board communications, the cab electronics system 238 may communicate commands via a WiFi/cellular modem 250 back to the off-board remote controller interface 204. In various alternative implementations, the analytics server 316 and off-board remote controller interface 204 may further process the commands received from the lead locomotive 208 of the lead consist or from a back office command center in order to modify the commands or otherwise interpret the commands before transmitting commands to the locomotives. Modification of the commands may be based on additional information the remote controller interface has acquired from data acquisition hub 312 and one or more sensors located on the locomotives, or other stored data. The commands transmitted from the remote controller interface 204 by dispatch personnel may be received from the remote controller interface in parallel at each of the locomotives of multiple trailing consists.

In addition to throttle, dynamic braking, and braking commands, the remote controller interface 204 may also communicate other commands to the cab electronics systems of the on-board controllers on one or more locomotives in multiple consists. These commands may include switching a component such as a circuit breaker on-board a locomotive from a first state, in which the circuit breaker has not tripped, to a second state, in which the circuit breaker has tripped. The circuit breaker may be tripped in response to detection that an operating parameter of at least one component or subsystem of the locomotive has deviated from a predetermined range. When such a deviation occurs, a maintenance signal may be transmitted from the locomotive to the off-board remote controller interface 204. The maintenance signal may be indicative of a subsystem having deviated from the predetermined range as indicated by a circuit breaker having switched from a first state to a second state. The method may further include selectively receiving a command signal from the remote controller interface 204 at a control device on-board the locomotive, with the command signal causing the control device to autonomously switch the component from the second state back to the first state. In the case of a tripped circuit breaker, the command may result in resetting the circuit breaker.

The method of remotely controlling the locomotives in various consists of a train may also include configuring one or more programmable logic controllers (PLC) of microprocessor-based locomotive control systems 237 on-board one or more locomotives to selectively set predetermined ranges for operating parameters associated with various components or subsystems. In one exemplary implementation, a locomotive control system 237 may determine that a circuit of a particular subsystem of the associated locomotive is operating properly when the current flowing through the circuit falls within a particular range. A circuit breaker may be associated with the circuit and configured to trip when the current flowing through the circuit deviates from the determined range. In another exemplary implementation, the locomotive control system may determine that a particular flow rate of exhaust gas recirculation (EGR), or flow rate of a reductant used in exhaust gas aftertreatment, is required in order to meet particular fuel economy and/or emission levels. A valve and/or pump regulating the flow rate of exhaust gas recirculation and/or reductant may be controlled by the locomotive control system when a level of a particular pollutant deviates from a predetermined range. The predetermined ranges for various operating parameters may vary from one locomotive to another based on specific characteristics associated with each locomotive, including age, model, location, weather conditions, type of propulsion system, fuel efficiency, type of fuel, and the like.

A method of controlling locomotives in lead and trailing consists of a train in accordance with various aspects of this disclosure may include transmitting an operating control command from a lead locomotive in a lead consist of a train off-board to a remote controller interface. The remote controller interface may then relay that operating control command to one or more lead locomotives of one or more trailing consists of the train. In this way, the one or more trailing consists of the train may all respond reliably and in parallel with the same control commands that are being implemented on-board the lead locomotive of the lead consist. As discussed above, on-board controls of the lead locomotive of the lead consist in the train may include the energy management system or human operator 232 providing one or more of throttle, dynamic braking, or braking requests 234 to the cab electronics system 238. The cab electronics system 238 may process and integrate these requests along with other outputs from various gauges and sensors, and commands that may have been received from the off-board remote controller interface 204. The commands received from the off-board remote controller interface 204 may include commands generated manually by a user with the proper permission selecting a particular ride-through control level, or automatically based on a particular geo-fence that a locomotive is entering. The cab electronics system 238 may then communicate commands to the on-board locomotive control system 237. In parallel with these on-board communications, the cab electronics system 238 may communicate the same commands via a WiFi/cellular modem 250, or via a locomotive interface gateway 335 and WiFi/cellular modem 250 to the off-board remote controller interface 204. In various alternative implementations, the off-board remote controller interface 204 may further process the commands received from the lead locomotive 208 of the lead consist in order to modify the commands before transmitting the commands to lead locomotives of trailing consists. Modification of the commands may be based on additional information the remote controller interface has acquired from the lead locomotives of the trailing consists, trip plans, information from maps or other stored data, and the results of machine learning, virtual system modeling, synchronization, and calibration performed by the analytics server 316. The commands may be received from the remote controller interface in parallel at each of the lead locomotives 248 of multiple trailing consists.

A method of controlling locomotives in lead and trailing consists of a train in accordance with various aspects of this disclosure may include receiving real-time and historical operational and structural data for use as training data from one or more of systems and components of the train at a data acquisition hub communicatively connected to one or more of sensors and databases associated with one or more locomotives or other components of the train. The method may further include simulating, using a virtual system modeling engine, in-train forces and train operational characteristics using physics-based equations, kinematic or dynamic modeling of behavior of the train or components of the train during operation when the consist is changing speed, and inputs derived from stored historical contextual data. The stored historical contextual data may include one or more of a number of locomotives in the train, age or amount of usage of one or more locomotives of the train or other components of the train, weight distribution of the train, length of the train, speed of the train, control configurations for one or more locomotives or consists of the train, power notch settings of one or more locomotives of the train, braking implemented in the train, positive train control characteristics implemented in the train, grade, temperature, or other characteristics of train tracks on which the train is operating, and engine operational parameters that affect performance of one or more locomotive engines for the train.

The exemplary method according to this disclosure may still further include storing one or more virtual system models simulated by the virtual system modeling engine in a virtual system model database, wherein each of the one or more virtual system models includes a mapping between different combinations of the stored historical contextual data and corresponding simulated in-train forces and train operational characteristics that occur when the consist is changing speed. A machine learning engine may calculate relative weights to assign to each of different types of the stored historical contextual data of each of the one or more virtual system models and assign the relative weights to the stored historical contextual data. The machine learning engine may also train a learning system using the weighted stored historical contextual data and the training data to determine a probability of each of the one or more virtual system models providing an accurate representation of actual in-train forces and train operational characteristics that occur during acceleration of the train after braking. The machine learning engine may use a learning function including at least one learning parameter.

Training the learning system may include providing the weighted stored historical contextual data as an input to the learning function, the learning function being configured to use the at least one learning parameter to generate an output based on the input. The training may cause the learning function to generate the output based on the input. The training may also include comparing the output to the training data, wherein the training data includes data produced by sensors having captured actual information on in-train forces and train operational characteristics during acceleration of the train after braking. Additional aspects of the training may also include comparing the determined probabilities of each of the virtual system models to a predetermined threshold probability level, and initiating adjustments to one or more of the calculated relative weights assigned to each of the different types of the stored historical contextual data of each of the one or more virtual system models to improve the determined probabilities of each of the virtual system models based on actual information on in-train forces and train operational characteristics acquired from a plurality of different trains operating under different conditions.

A method of controlling locomotives in lead and trailing consists of a train in accordance with various aspects of this disclosure may still further include adjusting one or more of throttle requests, dynamic braking requests, and pneumatic braking requests for the one or more locomotives of the train using an energy management system associated with the one or more locomotives of the train based at least in part on one of the virtual system models with the highest probability of providing an accurate representation of actual in-train forces and train operational characteristics and with one or more of the simulated in-train forces and train operational characteristics falling within a predetermined acceptable range of values. The method according to various exemplary implementations of this disclosure may include minimizing in-train forces in a train with a hybrid consist including a plurality of locomotives, wherein the hybrid consist includes at least one diesel-electric locomotive and at least one battery electric locomotive. The method may include receiving real-time and historical operational and structural data from one or more of systems and components of the train at the data acquisition hub communicatively connected to one or more of sensors and databases associated with one or more locomotives or other components of the train, simulating, using a virtual system modeling engine, in-train forces and train operational characteristics using physics-based equations, kinematic or dynamic modeling of behavior of the train or components of the train during operation when the consist is changing speed, and inputs derived from stored historical contextual data characteristic of the train, storing one or more virtual system models simulated by the virtual system modeling engine in a virtual system model database, wherein each of the one or more virtual system models includes a mapping between different combinations of the stored historical contextual data and corresponding simulated in-train forces and train operational characteristics that occur when the consist is changing speed, and using an energy management system associated with one or more locomotives of the train to determine an easing function of tractive effort vs. time that will minimize the in-train forces created by changes in tractive effort responsive to power notch changes in the at least one diesel-electric locomotive, and command execution of the easing function by one or more of the battery electric locomotives based at least in part on one of the virtual system models with the simulated in-train forces and train operational characteristics falling within a predetermined acceptable range of values.

The method of remotely controlling the locomotives in various consists of a train may also include configuring one or more programmable logic controllers (PLC) of microprocessor-based locomotive control systems 237 on-board one or more lead locomotives to selectively set predetermined ranges for operating parameters associated with various components or subsystems. As discussed above, the predetermined ranges for operating parameters may be selectively set based at least in part on a manually or automatically selected ride-through control level and a geo-fence associated with the location of the locomotive. In one exemplary implementation, a locomotive control system 237 may determine that a circuit of a particular subsystem of the associated locomotive is operating properly when the current flowing through the circuit falls within a particular range. A circuit breaker may be associated with the circuit and configured to trip when the current flowing through the circuit deviates from the determined range. In another exemplary implementation, the locomotive control system may determine that a particular flow rate of exhaust gas recirculation (EGR), or flow rate of a reductant used in exhaust gas aftertreatment, is required in order to meet particular fuel economy and/or emission levels. A valve and/or pump regulating the flow rate of exhaust gas recirculation and/or reductant may be controlled by the locomotive control system when a level of a particular pollutant deviates from a predetermined range. The predetermined ranges for various operating parameters may vary from one locomotive to another based on specific characteristics associated with each locomotive, including age, model, location, weather conditions, type of propulsion system, fuel efficiency, type of fuel, and the like.

The method of controlling locomotives in a train in accordance with various implementations of this disclosure may still further include the cab electronics system 238 on-board a locomotive receiving and processing data outputs from one or more of gauges, indicators, sensors, and controls on-board the locomotive. The cab electronics system 238 may also receive and process, e.g., throttle, dynamic braking, and pneumatic braking requests from the energy management system and/or human operator 232 on-board the locomotive, and command signals from the off-board remote controller interface 204. The command signals received from off-board the locomotive, or generated on-board the locomotive may be determined at least in part by a selected ride-through control level and the particular geo-fence associated with the current location of the train. The cab electronics system 238 may then communicate appropriate commands to the locomotive control system 237 and/or electronic air brake system 236 based on the requests, data outputs and command signals. The locomotive control system 237 may perform various control operations such as resetting circuit breakers, adjusting throttle settings, activating dynamic braking, and activating pneumatic braking in accordance with the commands received from the cab electronics system 238.

It will be apparent to those skilled in the art that various modifications and variations can be made to the systems and methods of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A train control system for minimizing in-train forces in a train with a hybrid consist including at least one diesel-electric locomotive and at least one battery electric locomotive, the train control system comprising:
   a virtual in-train forces modeling engine configured to simulate in-train forces and train operational characteristics using:
      kinematic or dynamic modeling of behavior of the train or components of the train during operation when the consist is changing speed, and
      inputs derived from stored historical contextual data characteristic of the train;
   a virtual in-train forces model database configured to store one or more virtual in-train forces models simulated by the virtual in-train forces modeling engine, wherein each of the one or more virtual in-train forces models includes a mapping between:
different combinations of the stored historical contextual data, and
corresponding simulated in-train forces and train operational characteristics that occur when the consist is changing speed; and
an energy management system associated with one or more locomotives of the train and configured to:
determine an easing function reflecting a cumulative effect of combining a first tractive effort over time of the at least one diesel-electric locomotive and a second tractive effect over time of the at least one battery electric locomotive, wherein the determined easing function will minimize the in-train forces created by changes in tractive effort responsive at least to power notch changes in the at least one diesel-electric locomotive, and
command execution of the determined easing function by one or more of the battery electric locomotives based at least in part on one of the virtual in-train forces models with the simulated in-train forces and train operational characteristics falling within a predetermined range of values.

2. The train control system of claim 1, further including:
an analytics engine and a calibration engine programmed to assimilate, analyze, and calibrate real time information from the locomotives and from sensors disposed on draft gears and couplers interconnecting the locomotives or the locomotives and other rail cars in the train with determinations made by the virtual in-train forces modeling engine onboard at least one of the plurality of locomotives, wherein the plurality of locomotives of the train are configured to operate collectively based on a common goal of minimizing in-train forces while optimizing fuel consumption for the train; and
a data acquisition hub communicatively connected to one or more of the sensors and databases associated with one or more of the locomotives or other components of the train and configured to acquire real-time and historical operational and structural data from one or more of systems and components of the train, the one or more sensors comprising one or more of LIDAR sensors, RADAR sensors, accelerometers, gyroscopic sensors, optical recognition sensors, and physical strain gauges configured to measure displacements or forces at the draft gears and couplers interconnecting the locomotives, and wherein the stored historical contextual data characteristic of the train includes one or more of a number of locomotives in the train, position or type of each locomotive, age or amount of usage of one or more locomotives of the train or other components of the train, weight distribution of the train, length of the train, speed of the train, control configurations for one or more locomotives or consists of the train, power notch settings of one or more locomotives of the train, braking implemented in the train, grade, temperature, state of health (SOH), state of charge (SOC), number of charge cycles, or cell temperatures of one or more batteries in the at least one battery electric locomotive, and diesel engine operational parameters that affect performance of one or more locomotive engines for the train, and wherein:
the energy management system is configured to determine the easing function, in real time, based on:
dynamic forces measured at couplers between locomotives of the train, and
differential velocities between locomotives of the train.

3. The train control system of claim 2, wherein the virtual in-train forces modeling engine includes a machine learning engine, and the machine learning engine is configured to train a neural network by inputting training data derived from the stored historical contextual data to a first layer of the neural network, wherein the output generated by a learning function executed by the machine learning engine includes a plurality of first outputs from the neural network generated based on the inputs, and at least one learning parameter used by the machine learning engine includes a characteristic of the neural network which is modified to reduce a difference between the plurality of first outputs and the training data.

4. The train control system of claim 1, wherein the virtual in-train forces modeling engine is configured to simulate the in-train forces and train operational characteristics during a period of time when the train includes at least one locomotive with an associated energy management system that is transitioning from a braking control to an acceleration control.

5. The train control system of claim 4, wherein the virtual in-train forces modeling engine is configured to simulate the in-train forces and train operational characteristics during a period of time when the train includes at least one locomotive with an associated energy management system that is transitioning and ramping up from heavy dynamic braking at the bottom of a hill to full throttle on the way back up an adjacent hill in a direction of travel of the train along the train tracks.

6. The train control system of claim 2, wherein the real-time and historical operational and structural data acquired by the data acquisition hub includes one or more of structural stresses on one or more couplers interconnecting one or more of locomotives and non-powered rail cars of the train, and measured vibrations of engine components caused by harmonic nodes encountered while ramping up power output of one or more of the locomotive engines of the train.

7. The train control system of claim 6, wherein the energy management system is configured to adjust one or more of throttle requests, dynamic braking requests, and pneumatic braking requests for the one or more associated locomotives of the train using a microprocessor-based locomotive control system, a cab electronics system, and an electronic pneumatic brake system mounted within a cab of each of the one or more locomotives.

8. The train control system of claim 7, wherein the energy management system is configured to adjust one or more of throttle requests, dynamic braking requests, and pneumatic braking requests for the one or more associated locomotives of the train while transitioning and ramping up from heavy dynamic braking at the bottom of a hill to full throttle on the way back up an adjacent hill in a direction of travel of the train along the train tracks, and while increasing a ramp rate and maintaining the structural stresses on one or more couplers and the vibrations of engine components within predetermined ranges of values.

9. The train control system of claim 2, wherein the virtual in-train forces modeling engine includes a machine learning engine configurable by a user in order to adjust relative weights that are assigned to each of different types of the stored historical contextual data of each of the one or more virtual system models, and wherein one or more of the predetermined ranges of values for simulated in-train forces and train operational characteristics are configurable by the user.

10. A method of minimizing in-train forces in a train with a hybrid consist including at least one diesel-electric locomotive and at least one battery electric locomotive, the method comprising:
receiving real-time and historical operational and structural data from one or more of systems and components of the train at a data acquisition hub communicatively connected to one or more of sensors and databases associated with one or more locomotives or other components of the train;
simulating, using a virtual system modeling engine, in-train forces and train operational characteristics using kinematic or dynamic modeling of behavior of the train or components of the train during operation when the consist is changing speed, and inputs derived from stored historical contextual data characteristic of the train;
storing one or more virtual system models simulated by the virtual system modeling engine in a virtual system model database, wherein each of the one or more virtual system models includes a mapping between different combinations of the stored historical contextual data and corresponding simulated in-train forces and train operational characteristics that occur when the consist is changing speed; and
using an energy management system associated with one or more locomotives of the train to determine an easing function reflecting a cumulative effect of combining a first tractive effort over time of the at least one diesel-electric locomotive and a second tractive effect over time of the at least one battery electric locomotive, wherein the determined easing function will minimize the in-train forces created by changes in tractive effort responsive at least to power notch changes in the at least one diesel-electric locomotive, and command execution of the determined easing function by one or more of the battery electric locomotives based at least in part on one of the virtual system models with the simulated in-train forces and train operational characteristics falling within a predetermined range of values.

11. He method of claim 10, wherein the virtual system modeling engine includes a machine learning engine, and the machine learning engine includes at least one of a neural network, a support vector machine, a Markov decision process engine, a decision tree based algorithm, or a Bayesian based estimator, and wherein the stored historical contextual data includes one or more of a number of locomotives in the train, age or amount of usage of one or more locomotives of the train or other components of the train, weight distribution of the train, length of the train, speed of the train, control configurations for one or more locomotives or consists of the train, power notch settings of one or more locomotives of the train, braking implemented in the train, grade, temperature, or other characteristics of train tracks on which the train is operating, state of health (SOH), state of charge (SOC), number of charge cycles, or cell temperatures of one or more batteries in the at least one battery electric locomotive, and diesel engine operational parameters that affect performance of one or more locomotive engines for the train.

12. The method of claim 11, wherein the machine learning engine includes a neural network, and the machine learning engine is configured to train the neural network by providing the inputs derived from stored historical contextual data as the input to a first layer of the neural network, wherein the output generated by a learning function executed by the machine learning engine includes a plurality of first outputs from the neural network generated based on the inputs, and at least one learning parameter used by the machine learning engine includes a characteristic of the neural network which is modified to reduce a difference between the plurality of first outputs and the training data.

13. The method of claim 10, wherein the virtual system modeling engine is configured to simulate the in-train forces and train operational characteristics during a period of time when the train includes at least one locomotive with an associated energy management system that is transitioning from a braking control to an acceleration control.

14. The method of claim 13, wherein the virtual system modeling engine is configured to simulate the in-train forces and train operational characteristics during a period of time when the train includes at least one locomotive with an associated energy management system that is transitioning and ramping up from heavy dynamic braking at the bottom of a hill to full throttle on the way back up an adjacent hill in a direction of travel of the train along the train tracks.

15. The method of claim 10, wherein the real-time and historical operational and structural data acquired by the data acquisition hub includes one or more of structural stresses on one or more knuckles interconnecting one or more of locomotives and non-powered rail cars of the train, and measured vibrations of engine components caused by harmonic nodes encountered while ramping up power output of one or more of the locomotive engines of the train.

16. The method of claim 15, wherein the energy management system is configured to adjust one or more of throttle requests, dynamic braking requests, and pneumatic braking requests for the one or more associated locomotives of the train using a microprocessor-based locomotive control system, a cab electronics system, and an electronic pneumatic brake system mounted within a cab of each of the one or more locomotives.

17. The method of claim 16, wherein the energy management system is configured to adjust one or more of throttle requests, dynamic braking requests, and pneumatic braking requests for the one or more associated locomotives of the train while transitioning and ramping up from heavy dynamic braking at the bottom of a hill to full throttle on the way back up an adjacent hill in a direction of travel of train along the train tracks, and while increasing a ramp rate and maintaining the structural stresses on one or more couplers and the vibrations of engine components within predetermined ranges of values.

18. The method of claim 11, wherein the machine learning engine is configurable by a user in order to adjust the relative weights that are assigned to each of different types of the stored historical contextual data of each of the one or more virtual system models, and wherein the predetermined ranges of values for simulated in-train forces and train operational characteristics are configurable by the user.

19. A hybrid consist of a train with at least one diesel-electric locomotive and at least one battery electric locomotive, wherein the hybrid consist includes a train control system for minimizing in-train forces in the train, the train control system comprising:
a virtual in-train forces modeling engine configured to simulate in-train forces and train operational characteristics using:
kinematic or dynamic modeling of behavior of the train or components of the train during operation when the consist is changing speed, and inputs derived from stored historical contextual data characteristic of the train;

a virtual in-train forces model database configured to store one or more virtual in-train forces models simulated by the virtual in-train forces modeling engine, wherein each of the one or more virtual in-train forces models includes a mapping between:

different combinations of the stored historical contextual data, and corresponding simulated in-train forces and train operational characteristics that occur when the consist is changing speed; and an energy management system associated with one or more locomotives of the train and configured to:

determine an easing function reflecting a cumulative effect of combining a first tractive effort over time of the at least one diesel-electric locomotive and a second tractive effect over time of the at least one battery electric locomotive, wherein the determined easing function will minimize the in-train forces created by changes in tractive effort responsive at least to power notch changes in the at least one diesel-electric locomotive, and command execution of the determined easing function by one or more of the battery electric locomotives based at least in part on one of the virtual in-train forces models with the simulated in-train forces and train operational characteristics falling within a predetermined range of values.

20. The hybrid consist of claim 19, wherein the virtual in-train forces modeling engine includes a machine learning engine programmed to implement at least one of a neural network, a support vector machine, a Markov decision process engine, a decision tree based algorithm, or a Bayesian based estimator, and wherein the real-time and historical operational and structural data acquired by the data acquisition hub includes one or more of structural stresses on one or more couplers interconnecting one or more of locomotives and non-powered rail cars of the train; measured vibrations of engine components caused by harmonic nodes encountered while ramping up power output of one or more of the locomotive engines of the train; a number of locomotives in the train; position or type of each locomotive; age or amount of usage of one or more locomotives of the train or other components of the train; weight distribution of the train; length of the train; speed of the train; control configurations for one or more locomotives or consists of the train; power notch settings of one or more locomotives of the train; braking implemented in the train; grade, temperature, or other characteristics of train tracks on which the train is operating; state of health (SOH), state of charge (SOC), number of charge cycles, or cell temperatures of one or more batteries in the at least one battery electric locomotive; and diesel engine operational parameters that affect performance of one or more locomotive engines for the train.

\* \* \* \* \*